United States Patent
Moriyoshi

(10) Patent No.: US 11,336,889 B2
(45) Date of Patent: May 17, 2022

(54) MOVING IMAGE ENCODING DEVICE AND METHOD FOR REDUCING FLICKER IN A MOVING IMAGE

(71) Applicant: NEC Corporation, Tokyo (JP)

(72) Inventor: Tatsuji Moriyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/631,235

(22) PCT Filed: Jul. 17, 2018

(86) PCT No.: PCT/JP2018/026705
§ 371 (c)(1),
(2) Date: Jan. 15, 2020

(87) PCT Pub. No.: WO2019/017327
PCT Pub. Date: Jan. 24, 2019

(65) Prior Publication Data
US 2020/0221076 A1 Jul. 9, 2020

(30) Foreign Application Priority Data

Jul. 19, 2017 (JP) .............................. JP2017-140109

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/154* (2014.11); *H04N 19/159* (2014.11); *H04N 19/172* (2014.11)

(58) Field of Classification Search
None
See application file for complete search history.

(56) References Cited

U.S. PATENT DOCUMENTS

| 8,654,844 B1 | 2/2014 | Hoang |
| 2007/0036213 A1 | 2/2007 | Matsumura et al. |

(Continued)

FOREIGN PATENT DOCUMENTS

| JP | 2006-229411 A | 8/2006 |
| JP | 2007-049629 A | 2/2007 |

(Continued)

OTHER PUBLICATIONS

International Search Report for PCT Application No. PCT/JP2018/026705, dated Aug. 28, 2018.

(Continued)

*Primary Examiner* — Y Lee
(74) *Attorney, Agent, or Firm* — Sughrue Mion, PLLC

(57) ABSTRACT

The moving image encoding device maintains high encoding efficiency and performs encoding to reduce flicker occurrence in reproducing a moving image in moving image encoding processing by including an acquisition unit acquiring a succeeding frame of the target frame in encoding frame order when an encoding target frame is the inter picture in encoding a moving image including frames for which an intra or inter picture is determined; a determination unit determining whether an occurrence degree of flicker presumed in decoding the encoded moving image satisfies a criterion, based on characteristics of the target frame and the succeeding frame; and a generation unit 53 generating, when the determination result indicates that the criterion is satisfied, as a prediction target image used in encoding the target frame, a provisional prediction image based on the succeeding frame and a reference frame referred to by the target frame.

15 Claims, 17 Drawing Sheets

(51) Int. Cl.
*H04N 19/154* (2014.01)
*H04N 19/159* (2014.01)
*H04N 19/172* (2014.01)

(56) References Cited

U.S. PATENT DOCUMENTS

2009/0046092 A1 2/2009 Sato et al.
2010/0278236 A1 11/2010 Yang et al.

FOREIGN PATENT DOCUMENTS

| JP | 2007-214785 A | 8/2007 |
| JP | 2008-219630 A | 9/2008 |
| JP | 4246723 B2 | 4/2009 |
| JP | 2009-111647 A | 5/2009 |
| JP | 4383240 B2 | 12/2009 |
| JP | 4528694 B2 | 8/2010 |
| WO | 2007/091601 A1 | 8/2007 |
| WO | 2009/091387 A1 | 7/2009 |

OTHER PUBLICATIONS

English translation of Written opinion for PCT Application No. PCT/JP2018/026705.
ITU-T Recommendation H.264 "Advanced video coding for generic audiovisual services", Mar. 2010.
ITU-T Recommendation H.265 "High efficiency video coding", Apr. 2013.
"A Study of Reducing Flicker of H.264 in Intra Mode Coding", Iguchi et al., Forum on Information Technology (FIT2003), pp. 277 and 278, Aug. 2003, Japan.
Xiaopeng Fan et al., Flickering Reduction in All Intra Frame Coding, Joint Video Team (JVT) 5th Meeting: Geneva, JVT-E070.doc, Oct. 17, 2002.
Japanese Office Action for JP Application No. 2019-531032 dated Dec. 8, 2020 with English Translation.

Fig. 10

```
                                                    320 GENERATION PROCEDURE
01  if (ENCODING TARGET FRAME IS INTER PICTURE TO BE REFERRED TO BY ANOTHER FRAME) {
02      TARGET IMAGE ← INPUT IMAGE
03      if (DEGREE OF OCCURRENCE OF FLICKER SATISFIES SECOND CRITERION) {
04          PREDICTION TARGET IMAGE ← PROVISIONAL ENCODING IMAGE
05      }
06      else {
07          PREDICTION TARGET IMAGE ← PROVISIONAL PREDICTION IMAGE
08      }
09  }
10  else {
11      TARGET IMAGE ← PROVISIONAL ENCODING IMAGE
12      if (DEGREE OF OCCURRENCE OF FLICKER SATISFIES SECOND CRITERION) {
13          PREDICTION TARGET IMAGE ← PROVISIONAL ENCODING IMAGE
14      }
15      else {
16          PREDICTION TARGET IMAGE ← PROVISIONAL PREDICTION IMAGE
17      }
18  }
```

MOVING IMAGE ENCODING DEVICE AND METHOD FOR REDUCING FLICKER IN A MOVING IMAGE

This application is a National Stage Entry of PCT/JP2018/026705 filed on Jul. 17, 2018, which claims priority from Japanese Patent Application 2017-140109 filed on Jul. 19, 2017, the contents of all of which are incorporated herein by reference, in their entirety.

TECHNICAL FIELD

The invention of the present application relates to a technique of encoding a moving image including a plurality of frames for which an intra picture or an inter picture is determined.

BACKGROUND ART

A moving image compression encoding technique is widely spread, and is used within a wide range such as digital broadcasting, distribution of a video content by an optical disc, and video distribution via the Internet or the like. As a technique of generating encoded data being capable of achieving a high-quality reproduction image by encoding a moving image signal with a low bitrate and a high compression rate, or decoding an encoded moving image, H.264/Moving Picture Experts Group (MPEG)-4 Advanced Video Coding (AVC), which is jointly standardized by the International Telecommunication Union (ITU) and the International Organization for Standardization (ISO), or the like is widely used. Since a specification of H.264/MPEG-4 (in the present application, hereinafter, referred to as H.264) is described, for example, in NPL 1, detailed description thereof is omitted.

Further, as a latest standard relating to moving image compression encoding, there is H.265/MPEG-H High Efficiency Video Coding (HEVC), which is standardized in 2013. Since a specification of H.265/MPEG-H (in the present application, hereinafter, referred to as H.265) is described, for example, in NPL 2, detailed description thereof is omitted. Since H.265 is capable of compressing a data size of a moving image to about a half of that of H.264, while maintaining video quality substantially equivalent to H.264, utilization thereof in a wide field is expected.

Since these moving image encoding techniques are configured by combination of a plurality of element techniques such as motion compensation prediction, orthogonal transformation of a prediction error image, quantization of an orthogonal transformation coefficient, and entropy encoding of a quantized orthogonal transformation coefficient, the techniques are called hybrid encoding.

These moving image encoding techniques achieve high compression efficiency by performing intra frame prediction (intra prediction) and inter frame prediction (inter prediction) in which a correlation relating to an image on a spatial axis and a time axis being one of characteristics of a moving image is used. In the intra frame prediction, a prediction image is generated, based on a pixel value included in encoded image blocks proximate to each other within a same image frame. On the other hand, in the inter frame prediction, motion compensation in which a prediction image is generated by correcting motion and positional displacement of a subject, a background, or the like between images proximate to each other on a time axis is generally used. Further, by encoding a difference (prediction residual difference) between an input image and a prediction image, it is possible to achieve efficient compression.

Among frames included in a moving image to be encoded, a frame to be encoded by the intra frame prediction is called an intra picture (an I picture). On the other hand, among the frames included in the moving image to be encoded, a frame to be encoded by the inter frame prediction is called an inter picture. The inter picture includes two types of frames (a P picture and a B picture) in which an inter frame prediction method is different. In this way, generally, in moving image encoding, encoding processing is performed with respect to a frame in which one of the above-described three types, namely, an I picture, a P picture, and a B picture is set as a picture type.

FIG. 17 is a block diagram conceptually illustrating a configuration of a general moving image encoding device 100 for encoding a moving image by employing the above-described intra frame prediction and inter frame prediction. The moving image encoding device 100 includes a frame buffer 101, a control information determination unit 102, a subtraction unit 103, a quantization unit 104, an encoding processing unit 105, an inverse quantization unit 106, an adder unit 107, a frame buffer 108, and a prediction unit 109.

The frame buffer 101 stores an input moving image being an encoding target. The control information determination unit 102 determines information (control information) for controlling encoding processing. The control information includes, for example, an encoding type (one of an I picture, a P picture, and a B picture) of a frame to be encoded next, and a reference relationship between frames in inter frame prediction, and an encoding order. The control information determination unit 102 rearranges and outputs frames included in the input moving image in the encoding order.

The moving image encoding device 100 performs encoding processing by using an image block of a predetermined size as a unit. When H.264 method is employed, for example, the moving image encoding device 100 uses a block called a macroblock (MB), which is constituted of 16 pixels in a vertical direction and 16 pixels in a horizontal direction (16×16 pixels). When H.265 method is employed, for example, the moving image encoding device 100 uses a plurality of blocks having a different size such as 16×16 pixels, 32×32 pixels, or 64×64 pixels, which are called a coding tree unit (CTU).

The prediction unit 109 performs intra frame prediction processing or inter frame prediction processing by setting a frame (image) output from the control information determination unit 102 as a prediction target image, and using the prediction target image, an encoded image (reference image) stored in the frame buffer 108, and a reconfigured image to be described later, and outputs a result of the processing as a prediction image.

The subtraction unit 103 outputs a residual difference signal acquired by subtracting, from a target image, a prediction image to be input from the prediction unit 109 by using a frame output from the control information determination unit 102 as the target image.

The quantization unit 104 outputs a quantized transformation coefficient (quantization coefficient) by performing orthogonal transformation processing similar to discrete cosine transform (DCT) with respect to the residual difference signal, and then, performing quantization processing. When H.264 method is employed, for example, the quantization unit 104 performs orthogonal transformation processing by using a block of 4×4 pixels or 8×8 pixels as a unit. When H.265 method is employed, for example, the quantization unit 104 performs orthogonal transformation processing by using a block of a predetermined size from 4×4 pixels to 32×32 pixels as a unit.

The inverse quantization unit 106 performs inverse integer transformation processing with respect to the quantization coefficient output from the quantization unit 104, after performing inverse quantization processing.

The adder unit 107 outputs a reconfigured image acquired by adding a value output by the inverse quantization unit 106 and a prediction image, and stores the reconfigured image in the frame buffer 108. The reconfigured image stored in the frame buffer 108 is used when the prediction unit 109 performs inter frame prediction processing with respect to a succeeding frame.

The encoding processing unit 105 outputs a bitstream representing a result of encoding an input moving image by performing entropy encoding processing with respect to the quantization coefficient output from the quantization unit 104 in accordance with a predetermined rule. The encoding processing unit 105 employs, as entropy encoding, context-based adaptive binary arithmetic coding (CABAC) (to be employed in H.264 method and H.265 method), or context-based adaptive variable length coding (CAVLC) (to be employed in H.264 method), for example. A more specific processing content to be performed by the moving image encoding device 100 is described in NPLs 1 and 2, for example.

Intra frame prediction processing (encoding with respect to an intra picture) is encoding, which is completed within one frame. Therefore, since intra frame prediction processing is processing independent for each of frames, whereas there is a merit that, in editing a moving image or the like, the processing is easily handled at a start point of decoding such as random access, channel switching, or bitrate switching, there is a demerit that encoding efficiency of the processing is low.

On the other hand, inter frame prediction processing (encoding with respect to an inter picture) is encoding in which information relating to another encoded frame is referred to. Therefore, in view of that inter frame prediction processing has a dependency relationship such that decoding is possible only after decoding of all frames to be referred to in prediction processing is completed, although encoding efficiency of the processing is high, the processing has a demerit that it is difficult to handle. In view of the above, the general moving image encoding device 100 employs intra frame prediction processing and inter frame prediction processing in combination in many applications.

In such moving image encoding processing, one or more inter pictures between one intra picture and a next intra picture are generically called a group of pictures (GOP). Further, a moving image is constituted by a plurality of GOPs. As encoding formats with respect to a GOP, there are a Closed-GOP (format) in which inter frame prediction extending over a plurality of GOPs is not allowed, and an Open-GOP (format) in which inter frame prediction extending over a plurality of GOPs is allowed.

Since an encoding configuration greatly differs between intra frame prediction processing and inter frame prediction processing, a difference occurs in characteristics of an encoded image. The general moving image encoding device 100 periodically (e.g. one time a second or the like) performs intra frame prediction processing in many applications, and performs inter frame prediction processing in other cases. When a moving image in which an intra picture is periodically inserted as described above is viewed, there is a problem that periodical flicker is perceived due to the above-described difference in characteristics of an encoded image. This is called intra flicker (in the present application, hereinafter, also referred to as "flicker"). The intra flicker conspicuously appears when a bitrate relating to a moving image is low, and becomes one of factors of deteriorating image quality of a moving image.

As described in NPL 3, for example, as a factor of occurrence of intra flicker, it is known that a difference occurs in a prediction image to be generated in an encoding process due to a difference between intra frame prediction processing and inter frame prediction processing, and the difference further increases in a process from quantization processing until inverse quantization processing. Therefore, expectation for a technique of reducing occurrence of such intra flicker is increasing.

As a technique associated with such technique, PTLs 1 and 2 disclose a technique of restricting an intra frame prediction mode or a prediction block size in such a way that flicker becomes inconspicuous, when a prediction image is generated in intra frame prediction processing. In this technique, preferentially selecting a prediction mode in which flicker is less likely to occur by adding an amount of occurrence of flicker to cost evaluation in selecting a prediction mode reduces flicker in a prediction image. Further, in this technique, by controlling a parameter relating to quantization of a block in which flicker is likely to occur in such a way as to be small, as compared with an ordinary state, an increase in flicker by quantization processing and inverse quantization processing is reduced.

Further, PTL 3 discloses a technique of reducing flicker by generating a decoded image by temporarily encoding as an inter picture in encoding an intra picture, and then, performing encoding by intra frame prediction by using the decoded image as a target image.

Furthermore, PTL 4 discloses a technique in which determination is made as to whether or not flicker is easily visually recognized with respect to a GOP, and when flicker is easily visually recognized, and an encoding format with respect to the GOP is a Closed-GOP, the encoding format is changed to an Open-GOP. In this technique, occurrence of flicker is reduced by changing the encoding format to an Open-GOP, and then, preferentially performing bidirectional prediction or the like with respect to an inter picture located earlier than an intra picture in terms of a display order. This is on the basis of the following tendency in each of the methods. Specifically, in the Closed-GOP, since a reference relationship in inter frame prediction is discontinued for each of GOPs, there is a tendency that a degree of occurrence of flicker becomes high in a boundary between the GOPs. On the other hand, in the Open-GOP, since image continuity in a time axis direction becomes high by inter frame prediction extending over GOPs, there is a tendency that flicker becomes inconspicuous.

Further, PTL 5 discloses a technique in which motion vector search is performed by sequential search by using a plurality of reference pictures. This technique also enables to select a position other than a position designated by a zero vector with respect to a block being an encoding target at an initial search start position of the sequential search. Further, in this technique, an initial search start position of at least one reference picture having a same parity as an encoding target picture is a position designated by a zero vector with respect to a block being an encoding target.

CITATION LIST

Patent Literature

[PTL 1] Japanese Patent No. 4246723
[PTL 2] Japanese Patent No. 4383240

[PTL 3] Japanese Patent No. 4528694
[PTL 4] International Publication No. WO2007/091601
[PTL 5] Japanese Unexamined Patent Application Publication No. 2009-111647

Non-Patent Literature

[NPL 1] ITU-T Recommendation H.264 "Advanced video coding for generic audiovisual services", March 2010
[NPL 2] ITU-T Recommendation H.265 "High efficiency video coding", April 2013
[NPL 3] "Method of Reducing Intra-mode Flickering in H. 264 Encoding", Iguchi et al., Forum on Information Technology (FIT2003), pp. 277 and 278, August 2003

SUMMARY OF INVENTION

Technical Problem

In the above-described techniques described in PTLs 1 to 3, for example, there is a problem that an encoding amount increases by lowering of encoding efficiency with respect to an intra picture. Generally, encoding efficiency with respect to an intra picture is lower than encoding efficiency with respect to an inter picture, and a ratio of an encoding amount of an intra picture with respect to an entirety of a moving image is large. Therefore, an increase in encoding amount of an intra picture greatly affects an encoding amount of a moving image as a whole.

Further, the technique described in PTL 4 has an issue that the technique is not applicable to use in which a Closed-GOP is necessary. In an application such as moving image editing or bitrate switching, a Closed-GOP in which each of GOPs can be handled independently is appropriate. However, the technique described in PTL 4 is not applicable to such use.

Furthermore, in the technique described in PTL 5, although an advantageous effect of reducing a processing amount relating to motion prediction in moving image encoding can be expected, an advantageous effect of reducing occurrence of flicker cannot be expected so much.

As described above, it cannot be said that the techniques described in PTLs 1 to 5 are sufficient for maintaining high encoding efficiency and achieving reduction of occurrence of flicker in moving image encoding processing. A main object of the invention of the present application is to provide a moving image encoding device and the like, which solve such issues.

Solution to Problem

A moving image encoding device according to one aspect of the invention of the present application includes acquisition means for acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames; determination means for determining whether or not a degree of occurrence of flicker to be presumed in decoding the moving image being encoded satisfies a first criterion, based on a characteristic of the target frame and a characteristic of the succeeding frame; and generation means for generating, when a determination result by the determination means indicates that the first criterion is satisfied, as a prediction target image to be used in encoding the target frame, a provisional prediction image based on a reference frame and the succeeding frame, the reference frame being referred to by the target frame among the plurality of frames.

In another viewpoint achieving the above-described object, a moving image encoding method according to one aspect of the invention of the present application includes by an information processing device, acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames; determining whether or not a degree of occurrence of flicker to be presumed in decoding the moving image being encoded satisfies a first criterion, based on a characteristic of the target frame and a characteristic of the succeeding frame; and generating, when a determination result relating to the degree of occurrence of flicker indicates that the first criterion is satisfied, as a prediction target image to be used in encoding the target frame, a provisional prediction image based on a reference frame and the succeeding frame, the reference frame being referred to by the target frame among the plurality of frames.

Further, in still another viewpoint achieving the above-described object, a moving image encoding program according to one aspect of the invention of the present application causes a computer to execute: acquisition processing of acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames; determination processing of determining whether or not a degree of occurrence of flicker to be presumed in decoding the moving image being encoded satisfies a first criterion, based on a characteristic of the target frame and a characteristic of the succeeding frame; and generation processing of generating, when a determination result by the determination processing indicates that the first criterion is satisfied, as a prediction target image to be used in encoding the target frame, a provisional prediction image based on a reference frame and the succeeding frame, the reference frame being referred to by the target frame among the plurality of frames.

Furthermore, the invention of the present application is also achievable by a computer readable non-volatile recording medium storing the moving image encoding program (computer program).

Advantageous Effects of Invention

The invention of the present application is able to maintain high encoding efficiency, and perform encoding in such a way that occurrence of flicker is reduced when a moving image is reproduced in moving image encoding processing.

BRIEF DESCRIPTION OF DRAWINGS

FIG. 10 is a diagram exemplifying a content of a generation procedure 320 to be employed by a generation unit 33 according to the third example embodiment of the invention of the present application.

EXAMPLE EMBODIMENT

In the following, example embodiments according to the invention of the present application are described in detail with reference to the drawings.

First Example Embodiment

Figure 1:
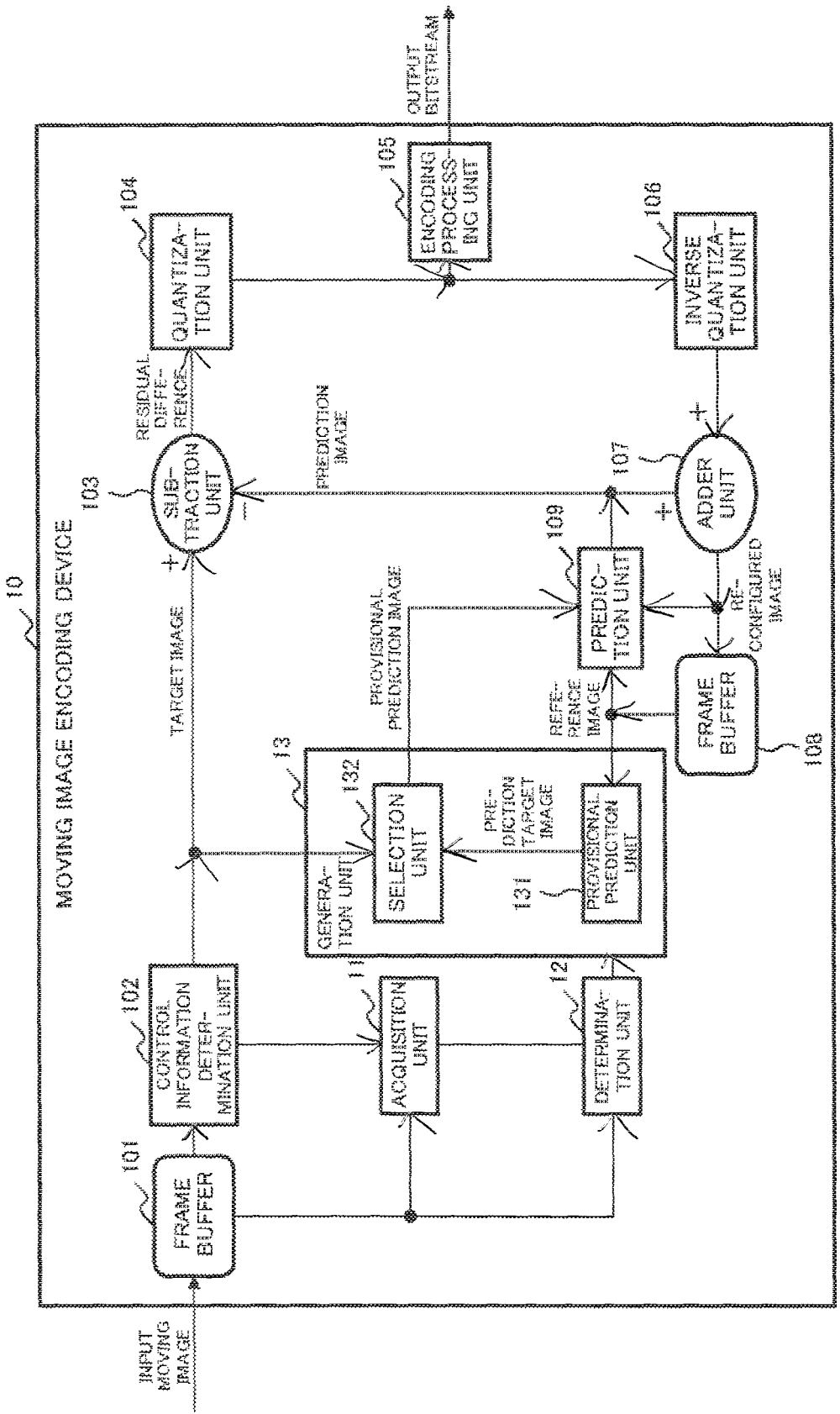
FIG. 1 is a block diagram illustrating a configuration of a moving image encoding device 10 according to a first example embodiment of the invention of the present application.

FIG. 1 is a block diagram conceptually illustrating a configuration of a moving image encoding device 10 according to a first example embodiment of the present invention. The moving image encoding device 10 according to the present example embodiment is a device for performing encoding by employing intra frame prediction and inter frame prediction with respect to an input moving image, and outputting a result of the encoding as a bitstream.

Figure 17:
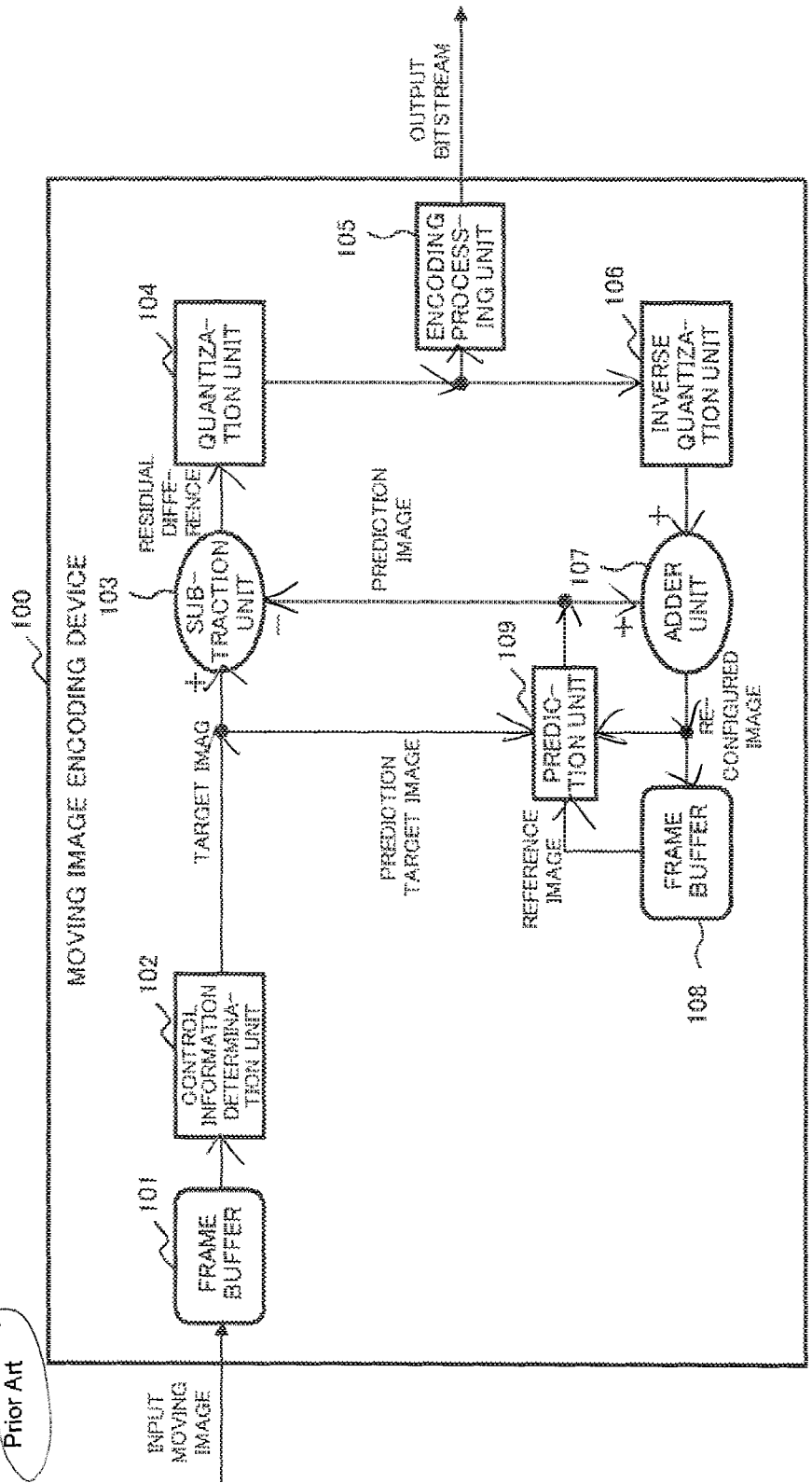
FIG. 17 is a block diagram illustrating a configuration of a general moving image encoding device 100.

The moving image encoding device 10 according to the present example embodiment includes an acquisition unit 11, a determination unit 12, a generation unit 13, a frame buffer 101, a control information determination unit 102, a subtraction unit 103, a quantization unit 104, an encoding processing unit 105, an inverse quantization unit 106, an adder unit 107, a frame buffer 108, and a prediction unit 109. In the present example embodiment, components having similar functions as those in the above-described general moving image encoding device 100 illustrated in FIG. 17 are indicated with same reference numbers as those of the components illustrated in FIG. 17. Specifically, the moving image encoding device 10 according to the present example embodiment includes the acquisition unit 11, the determination unit 12, and the generation unit 13, in addition to the components included in the above-described general moving image encoding device 100 exemplified in FIG. 17.

The moving image encoding device 10 according to the present example embodiment stores an input moving image in the frame buffer 101. The frame buffer 101 stores a frame (image) included in the input moving image according to a display order of the moving image.

The control information determination unit 102 determines control information for controlling encoding processing with respect to the input moving image stored in the frame buffer 101. As described above, the control information is, for example, information including an encoding type of a frame to be encoded next, a reference relationship between frames in inter frame prediction, and an encoding order.

Figure 2:
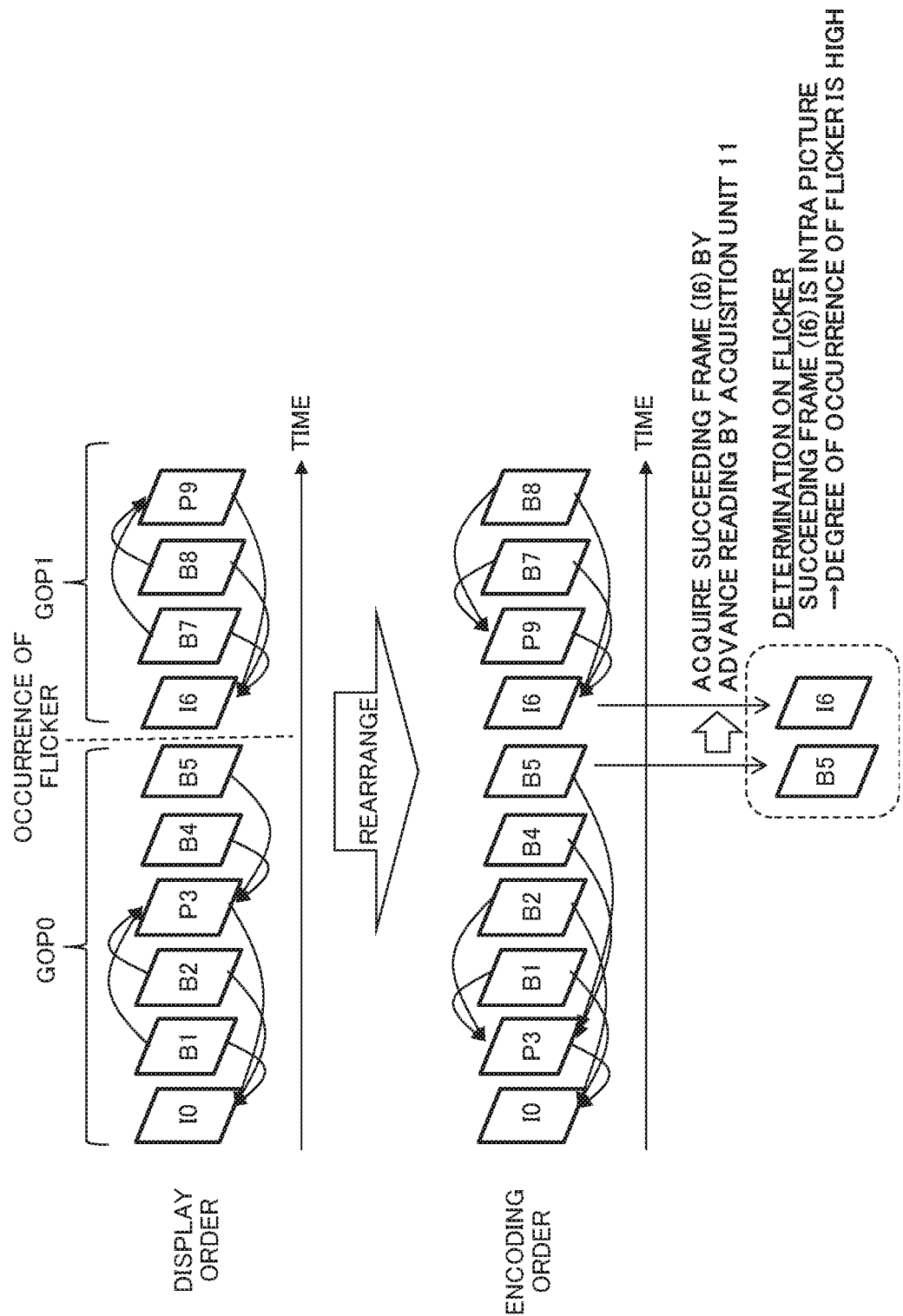
FIG. 2 is a diagram (case that encoding control by a Closed-GOP is performed) exemplifying a configuration of an input moving image in which control information is determined by a control information determination unit 102 according to the first example embodiment of the invention of the present application.
Figure 3:
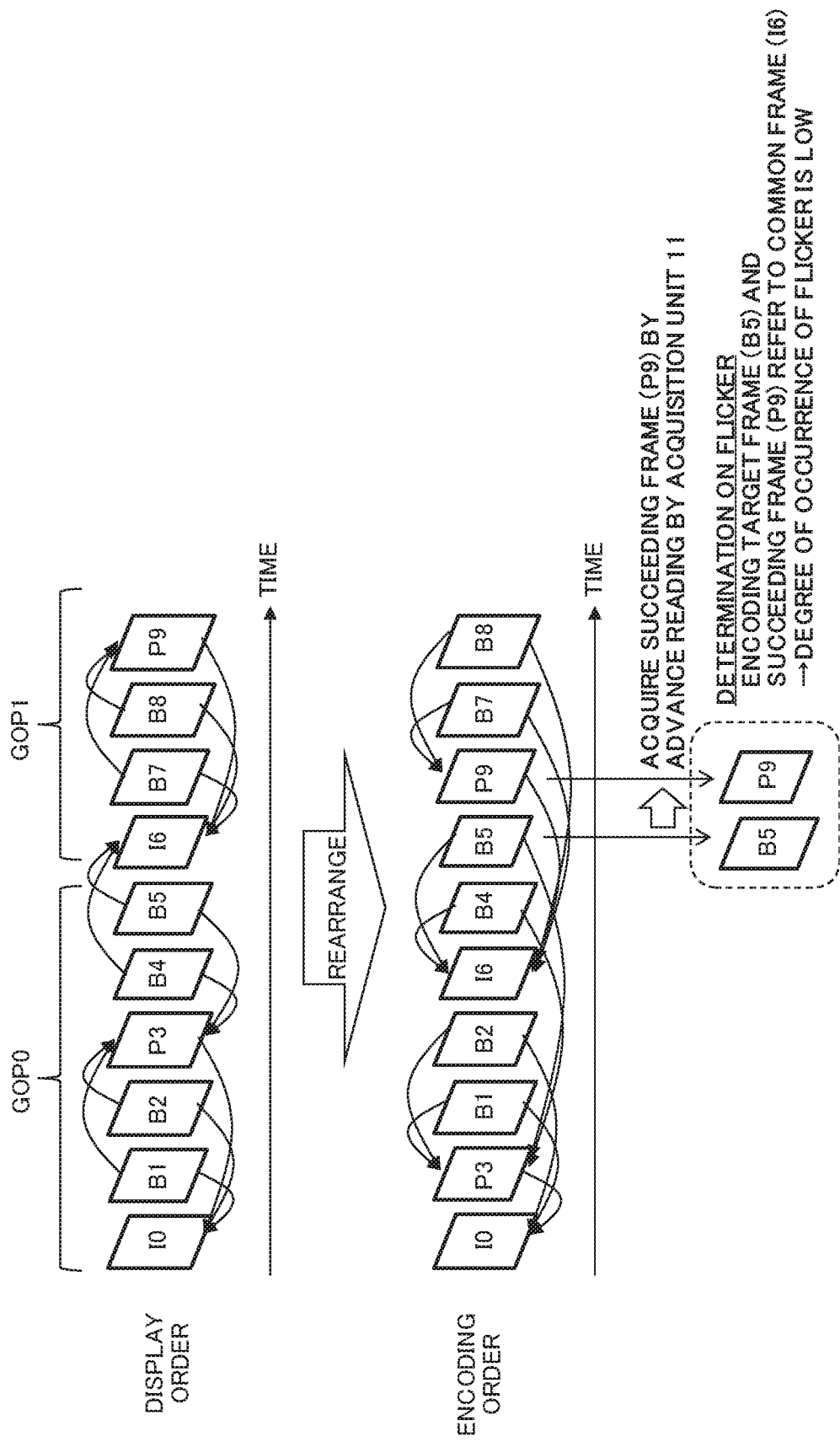
FIG. 3 is a diagram (case that encoding control by an Open-GOP is performed) exemplifying a configuration of an input moving image in which control information is determined by the control information determination unit 102 according to the first example embodiment of the invention of the present application.

FIGS. 2 and 3 are diagrams exemplifying a configuration of an input moving image in which control information is determined by the control information determination unit 102 according to the present example embodiment. Rectangles illustrated in FIGS. 2 and 3 indicate frames included in the input moving image and arranged in a time axis direction. Specifically, FIGS. 2 and 3 illustrate a manner in which each of the frames is displayed or encoded, as time elapses. FIG. 2 illustrates a case that the moving image encoding device 10 performs encoding control by a Closed-GOP, and FIG. 3 illustrates a case that the moving image encoding device 10 performs encoding control by an Open-GOP.

In FIGS. 2 and 3, symbols such as "I0" and "B1" appended to the frames by the control information determination unit 102 indicate a picture type of the frame, and a display order in a moving image. For example, a picture type of a frame displayed as "I0" in FIGS. 2 and 3 (in the present application, hereinafter, referred to as a frame (I0)) is an I picture, and a display order thereof is "0" (specifically, a frame to be displayed first). Likewise, a picture type of a frame (B1) is a B picture, and a display order thereof is "1" (a frame to be displayed after the 0-th frame).

The control information determination unit 102 according to the present example embodiment sets one of three picture types, namely, an I picture, a B picture, and a P picture for each of the frames. The I picture indicates that the picture is a frame (specifically, an intra picture) to be encoded by intra frame prediction. The B picture and the P picture indicate that the picture is a frame (specifically, an inter picture) to be encoded by inter frame prediction.

The B picture and the P picture differ in terms of reference relationship with respect to another frame in inter frame prediction. In FIGS. 2 and 3, arrow lines each connecting frames indicate a reference relationship with respect to another frame in inter frame prediction, which is determined by the control information determination unit 102. In the present example embodiment, for example, the frame (B1) refers to the frame (I0) and a frame (P3), a frame (B2) refers to the frame (I0) and the frame (P3), and the frame (P3) refers to the frame (I0). Specifically, a B picture refers to an I picture and a P picture, and the P picture refers to the I picture.

As exemplified in FIGS. 2 and 3, the control information determination unit 102 according to the present example embodiment determines that, as control information, an interval (I picture interval) between a certain I picture and a next I picture corresponds to six frames, and an interval (P picture interval) between a certain P picture and the next I picture corresponds to three frames in a display order. Specifically, in this case, the number of frames constituting each of GOPs is six.

The control information determination unit 102 determines an encoding order of frames, after determining a picture type of each of the frames, and a reference relationship between the frames. The control information determination unit 102 rearranges the frames arranged in a display order in such a way that a frame to be referred to comes earlier than a frame which refers to the frame in an encoding order, based on the reference relationship between the frames.

When encoding control by the Closed-GOP as exemplified in FIG. 2 is performed, the control information determination unit 102 rearranges frames closed within each of GOPs. In the example illustrated in FIG. 2, in GOP0, since the frame (B1) and the frame (B2) refer to the frame (P3), the control information determination unit 102 rearranges the frames in such a way that the frame (P3) comes earlier than the frames (B1) and (B2) in an encoding order. Thus, the encoding order in the GOP0 becomes an order: the frame (I0), the frame (P3), the frame (B1), the frame (B2), a frame (B4), and a frame (B5). The control information determination unit 102 also rearranges frames in another GOP, similarly to the GOP0.

When encoding control by the Open-GOP as exemplified in FIG. 3 is performed, the control information determination unit 102 rearranges frames in such a way that the frames are allowed to extend between GOPs. In the example illustrated in FIG. 3, since the frames (B4) and (B5) included in the GOP0 refer to a frame (I6) included in a GOP1, the control information determination unit 102 rearranges the frames in such a way that the frame (I6) comes earlier than the frames (B4) and (B5) in an encoding order. The control information determination unit 102 also rearranges frames similarly to the case of the example illustrated in FIG. 2 regarding the frames (B1), (B2), and (P3). Thus, the encoding order becomes an order: the frame (I0), the frame (P3), the frame (B1), the frame (B2), the frame (I6), the frame (B4), and the frame (B5). The control information determination unit 102 rearranges the frames succeeding to the frame (B5) according to a similar procedure.

The control information determination unit 102 inputs, to the acquisition unit 11 illustrated in FIG. 1, frames rearranged according to an encoding order, as encoding target frames serving as encoding targets.

The acquisition unit 11 confirms a picture type of an encoding target frame input from the control information determination unit 102 according to an encoding order. When the picture type is a B picture or a P picture (specifically, an encoding target frame is an inter picture), the acquisition unit 11 acquires one or more succeeding frames succeeding to the encoding target frame in an encoding order by advance reading. The acquisition unit 11 inputs, to the determination unit 12, the encoding target frame and the succeeding frame.

The determination unit 12 determines whether or not a degree of occurrence of flicker to be presumed in decoding the encoded input moving image satisfies a first criterion, based on a characteristic of the encoding target frame input from the acquisition unit 11, and a characteristic of the succeeding frame. In this case, a context that a degree of occurrence of flicker satisfies a first criterion indicates that flicker occurs to such an extent that a user viewing a decoded moving image can clearly visually recognize that flicker has occurred, for example. The first criterion can be determined in advance, based on an experimental result by a subject or the like, for example.

The determination unit 12 performs the above-described determination regarding the encoding target frame and the succeeding frame, based on a picture type, a reference relationship in inter frame prediction, a display characteristic of an image, and the like. For example, the determination unit 12 determines that a degree of occurrence of flicker satisfies the first criterion by assuming that the succeeding frame is an intra picture, or the encoding target frame and the succeeding frame are inter pictures which do not refer to a common frame.

The determination unit 12 further performs the above-described determination, based on a display characteristic of an image. At this occasion, for example, the determination unit 12 is able to employ determination using a flatness degree of a frame described in PTL 1, determination using scene change information or an activity described in PTL 4, or the like.

For example, determination by the determination unit 12 when encoding control by the Closed-GOP exemplified in FIG. 2 is performed is considered. In this case, image continuity in a time axis direction is lowered by discontinuation of a reference relationship in inter frame prediction between the GOP0 and the GOP1. In this case, a degree of occurrence of flicker becomes high in a boundary between the GOP0 and the GOP1 (specifically, between the frame (B5) and the frame (I6)). Therefore, in this case, the determination unit 12 determines that the degree of occurrence of flicker satisfies the first criterion in performing the above-described determination regarding the encoding target frame (B5) and the succeeding frame (I6).

On the other hand, for example, when encoding control by the Open-GOP exemplified in FIG. 3 is performed, since a reference relationship in inter frame prediction is not discontinued between the GOP0 and the GOP1, image continuity in a time axis direction is maintained. In this case, there is no likelihood that the degree of occurrence of flicker becomes high in a boundary between the GOP0 and the GOP1 after frame rearrangement (specifically, between the frame (B5) and a frame (P9)). Therefore, in this case, the determination unit 12 determines that the degree of occurrence of flicker does not satisfy the first criterion in performing the above-described determination regarding the encoding target frame (B5) and the succeeding frame (P9).

The determination unit 12 inputs, to the generation unit 13 illustrated in FIG. 1, a determination result acquired by the above-described determination.

As illustrated in FIG. 1, the generation unit 13 includes a provisional prediction unit 131 and a selection unit 132.

When a determination result input from the determination unit 12 indicates that the above-described first criterion is satisfied, the provisional prediction unit 131 generates a provisional prediction image by performing inter frame prediction using a reference frame to be referred to by the encoding target frame, and the succeeding frame succeeding to the encoding target frame.

Figure 4:
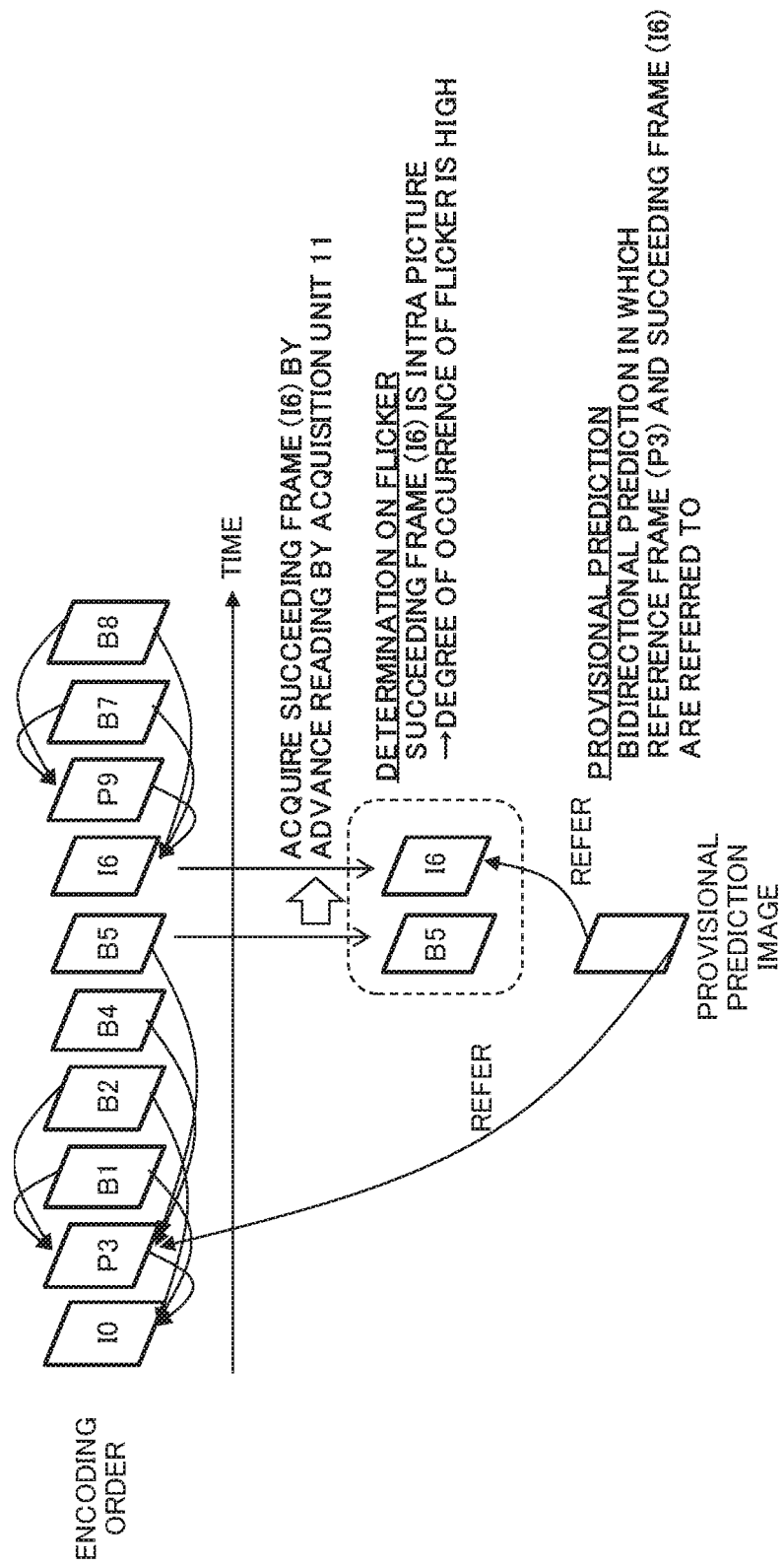
FIG. 4 is a diagram exemplifying processing of generating, as a prediction target image, a provisional prediction image with respect to the moving image exemplified in FIG. 2 by a generation unit 13 according to the first example embodiment of the invention of the present application.

FIG. 4 is a diagram exemplifying processing of generating a provisional prediction image with respect to an input moving image by the provisional prediction unit 131, when encoding control by the Closed-GOP exemplified in FIG. 2 is performed.

In this case, the determination unit 12 determines that the degree of occurrence of flicker satisfies the first criterion regarding the encoding target frame (B5) and the succeeding frame (I6). In response to receiving the determination, the provisional prediction unit 131 generates a provisional prediction image by performing bidirectional prediction in which the reference frame (P3) to be referred to by the encoding target frame (B5), and the succeeding frame (I6) are referred to (inter frame prediction using both of a frame preceding an encoding target frame and a succeeding frame in an encoding order).

The provisional prediction unit 131 may correct a provisional prediction image by performing weighted addition averaging for an input image indicated by the encoding target frame with respect to the provisional prediction image generated by the above-described bidirectional prediction. In this case, a weighting coefficient may be set to be a fixed ratio such as 1:1, for example. Alternatively, the provisional prediction unit 131 may perform weighting in such a way that a weight of a provisional prediction image increases, when a timewise distance between an input image and a reference image in generating the provisional prediction image is short, and the weight of the provisional prediction image decreases (a weight of the input image increases), when the timewise distance is long.

Further, the provisional prediction unit 131 may perform weighting in such a way that a weight of the provisional prediction image increases, as a value indicating a quantization step to be employed by the quantization unit 104 and the inverse quantization unit 106 increases, and a weight of the input image increases, as the value indicating the quantization step decreases.

Furthermore, the provisional prediction unit 131 may set a weighting coefficient relating to the provisional prediction image and the input image to a different value for each of areas (blocks) in an image. In this case, for example, the determination unit 12 calculates the above-described degree of occurrence of flicker for each of blocks included in an image (encoding target frame) and having a predetermined size. Further, the provisional prediction unit 131 performs weighting relating to the provisional prediction image and the input image depending on a degree of occurrence of flicker for each of the blocks calculated by the determination unit 12. Specifically, the provisional prediction unit 131 performs weighting for a certain block in such a way that a weight of the provisional prediction image increases, as the degree of occurrence of flicker increases, and a weight of the input image increases, as the degree of occurrence of flicker decreases.

As illustrated in FIG. 4, the provisional prediction unit 131 performs the above-described bidirectional prediction, for example, by using the reference frame (P3) and the succeeding frame (I6). At this occasion, the provisional prediction unit 131 may use an input image before being encoded for both of the reference frame (P3) and the succeeding frame (I6), or use a reconfigured image relating to the reference frame (P3) and an input image relating to the succeeding frame (I6).

The selection unit 132 in the generation unit 13 illustrated in FIG. 1 selects either a provisional prediction image generated by the provisional prediction unit 131, or an input image (image included in an input moving image and before being encoded) output as a target image by the control information determination unit 102, and inputs the selected image to the prediction unit 109, as a prediction target image.

When the encoding target frame is an I picture (specifically, an intra picture), the selection unit 132 selects the input image output as a target image by the control information determination unit 102. When the encoding target frame is a P picture or a B picture (specifically, an inter picture), and a determination result by the determination unit 12 indicates that the degree of occurrence of flicker does not satisfy the first criterion, the selection unit 132 selects the input image output as a target image by the control information determination unit 132.

When the encoding target frame is a P picture or a B picture, and a determination result by the determination unit 12 indicates that the degree of occurrence of flicker satisfies the first criterion, the selection unit 132 selects the provisional prediction image generated by the provisional prediction unit 131.

The subtraction unit 103, the quantization unit 104, the encoding processing unit 105, the inverse quantization unit 106, the adder unit 107, the frame buffer 108, and the prediction unit 109, which are included in the moving image encoding device 10 illustrated in FIG. 1, perform encoding processing similar to the above-described moving image encoding device 100 illustrated in FIG. 17 by using a target image output from the control information determination unit 102, and a prediction target image output from the generation unit 13.

Next, an operation (processing) of the moving image encoding device 10 according to the present example embodiment is described in detail with reference to the flowchart of FIG. 5.

The frame buffer 101 stores frames included in the input moving image (Step S101). After determining control information for controlling encoding processing with respect to the input moving image, the control information determination unit 102 rearranges the frames arranged in a display order in an encoding order (Step S102). The moving image encoding device 10 starts encoding processing with respect to the frames according to the encoding order (Step S103).

When the encoding target frame is not an inter picture (specifically, the encoding target frame is an intra picture) (No in Step S104), the generation unit 13 outputs, as a prediction target image, an input image (target image) input from the control information determination unit 102 (Step S109), and the processing proceeds to Step S110. When the encoding target frame is an inter picture (Yes in Step S104), the acquisition unit 11 acquires a succeeding frame succeeding to the encoding target frame in the encoding order by advance reading (Step S105).

The determination unit 12 determines whether or not the degree of occurrence of flicker satisfies the first criterion, based on a characteristic of the encoding target frame and a characteristic of the succeeding frame (Step S106). When the degree of occurrence of flicker does not satisfy the first criterion (No in Step S107), the processing proceeds to Step S109. When the degree of occurrence of flicker satisfies the first criterion (Yes in Step S107), the generation unit 13 generates, as a prediction target image, a provisional prediction image on the basis of a reference frame to be referred to by the encoding target frame, and the succeeding frame (Step S108).

The moving image encoding device 10 performs encoding processing with respect to the encoding target frame by using the target image and the prediction target image (Step S110). When encoding processing with respect to all frames included in the input moving image is not completed (No in Step S111), the processing returns to Step S104. When encoding processing with respect to all frames included in the input moving image is completed (Yes in Step S111), the entire processing is finished.

The moving image encoding device 10 according to the present example embodiment is able to maintain high encoding efficiency, and perform encoding in such a way that occurrence of flicker is reduced when the moving image is reproduced in moving image encoding processing. A reason for this is that, when an encoding target frame is an inter picture, the moving image encoding device 10 determines whether or not the degree of occurrence of flicker satisfies a criterion by acquiring a succeeding frame, and when the criterion is satisfied, the moving image encoding device 10 performs encoding processing by using a provisional prediction image generated by bidirectional prediction as a prediction target image.

In the following, an advantageous effect to be achieved by the moving image encoding device 10 according to the present example embodiment is described in detail.

When a moving image is encoded by employing intra frame prediction and inter frame prediction, flicker occurs by occurrence of a difference in prediction image to be generated in an encoding process or the like due to a difference between intra frame prediction processing and inter frame prediction processing. Although existing techniques for reducing such flicker are known, these techniques involve a problem such as, for example, lowered encoding efficiency, or difficulty in application within a wide range.

In view of such problems, the moving image encoding device 10 according to the present example embodiment includes the acquisition unit 11, the determination unit 12, and the generation unit 13, and, for example, is operated as described above with reference to FIGS. 1 to 5. Specifically, when, in encoding a moving image including a plurality of frames for which an intra picture or an inter picture is determined, a target frame to be encoded among the plurality of frames is the inter picture, the acquisition unit 11 acquires a succeeding frame succeeding to the target frame in an order of encoding the plurality of frames. The determination unit 12 determines whether or not the degree of occurrence of flicker to be presumed in decoding the encoded moving image satisfies the first criterion, based on a characteristic of the target frame and a characteristic of the succeeding frame. When a determination result by the determination unit 12 indicates that the first criterion is satisfied, the generation unit 13 generates, as a prediction target image to be used in encoding the target frame, a provisional prediction image on the basis of a reference frame to be referred to by the target frame among the plurality of frames, and the succeeding frame.

Specifically, the moving image encoding device 10 according to the present example embodiment generates a provisional prediction image being capable of providing a human with a visual effect approximate to continuous interpolation of an image in a time axis direction for a period during which the degree of occurrence of flicker increases. Thus, since a result of encoding processing by using the provisional prediction image also improves image continuity in a time axis direction, the moving image encoding device 10 is able to reduce occurrence of flicker in a moving image, when an encoded moving image is reproduced.

For example, as described in the techniques described in PTLs 1 to 3, when an encoding procedure with respect to an intra picture is changed, encoding efficiency of the intra picture is lowered. On the other hand, the moving image encoding device 10 according to the present example embodiment changes an encoding procedure with respect to an inter picture preceding an intra picture in an encoding order, without changing an encoding procedure with respect to the intra picture. In this case, although encoding efficiency of the inter picture is lowered, generally, encoding efficiency of the inter picture is higher than encoding efficiency of an intra picture, and a ratio of an encoding amount of the inter picture with respect to an entirety of a moving image is small. Therefore, the moving image encoding device 10 according to the present example embodiment is able to maintain high encoding efficiency.

Further, since the moving image encoding device 10 according to the present example embodiment maintains, in performing encoding processing, a state that is determined first by the control information determination unit 102 regarding a reference structure (GOP structure) relating to inter frame prediction, the moving image encoding device 10 has no limitation that it is not possible to apply to use in which a Closed-GOP is necessary, unlike the technique described in PTL 4, for example. Therefore, the moving image encoding device 10 according to the present example embodiment is able to reduce occurrence of flicker within a wide range of use.

Furthermore, the number of frames to be acquired by the acquisition unit 11 according to the present example embodiment by advance reading is not limited to one. For example, in the example illustrated in FIGS. 2 to 4, when an encoding target frame is the frame (B4), the acquisition unit 11 may acquire succeeding frames (specifically, the frame (B5) and the frame (I6)) succeeding to the frame (B4) by two frames. The acquisition unit 11 may set the number of succeeding frames to be acquired, not to a predetermined fixed value, but to a different value for each of encoding target frames.

For example, the acquisition unit 11 may set the number of succeeding frames to be acquired to a different value depending on a position of an encoding target frame in a GOP structure. In this case, in the example illustrated in FIGS. 2 to 4, the acquisition unit 11 may set the number of succeeding frames to be acquired to three, when the encoding target frame is a P picture, set the number of succeeding frames to be acquired to two, when the encoding target frame is the frame (B1) or the frame (B4), and set the number of succeeding frames to be acquired to one, when the encoding target frame is the frame (B2) or the frame (B5). Alternatively, the acquisition unit 11 may repeatedly perform advance reading of a succeeding frame in an order from a frame located next to an encoding target frame in an encoding order, until an intra picture, or an inter picture to be referred to from another frame, appears.

Note that, the moving image encoding device 10 according to the present example embodiment may employ, as a moving image encoding method, an encoding method such as VC-1, for example, in addition to H.264 and H.265, or an encoding method that is not included in a moving image encoding method according to an international standard. Further, picture types to be employed by the moving image encoding device 10 are not limited to the I picture, the P picture, and the B picture; and the I picture interval and the P picture interval are not limited to the above-described six frames and three frames. The moving image encoding device 10 may employ a GOP including a hierarchical B picture configuration, for example.

Further, the moving image encoding device 10 according to the present example embodiment performs inter frame prediction in a time axis direction. Alternatively, the moving image encoding device 10 may perform inter-hierarchy prediction or the like in scalable encoding, for example. Further, the moving image encoding device 10 may not employ intra frame prediction, and may employ a method in which encoding is completed within one frame. For example, an intra picture to which a method of performing encoding on the basis of Wavelet transformation is applied may be used.

Second Example Embodiment

Figure 6:
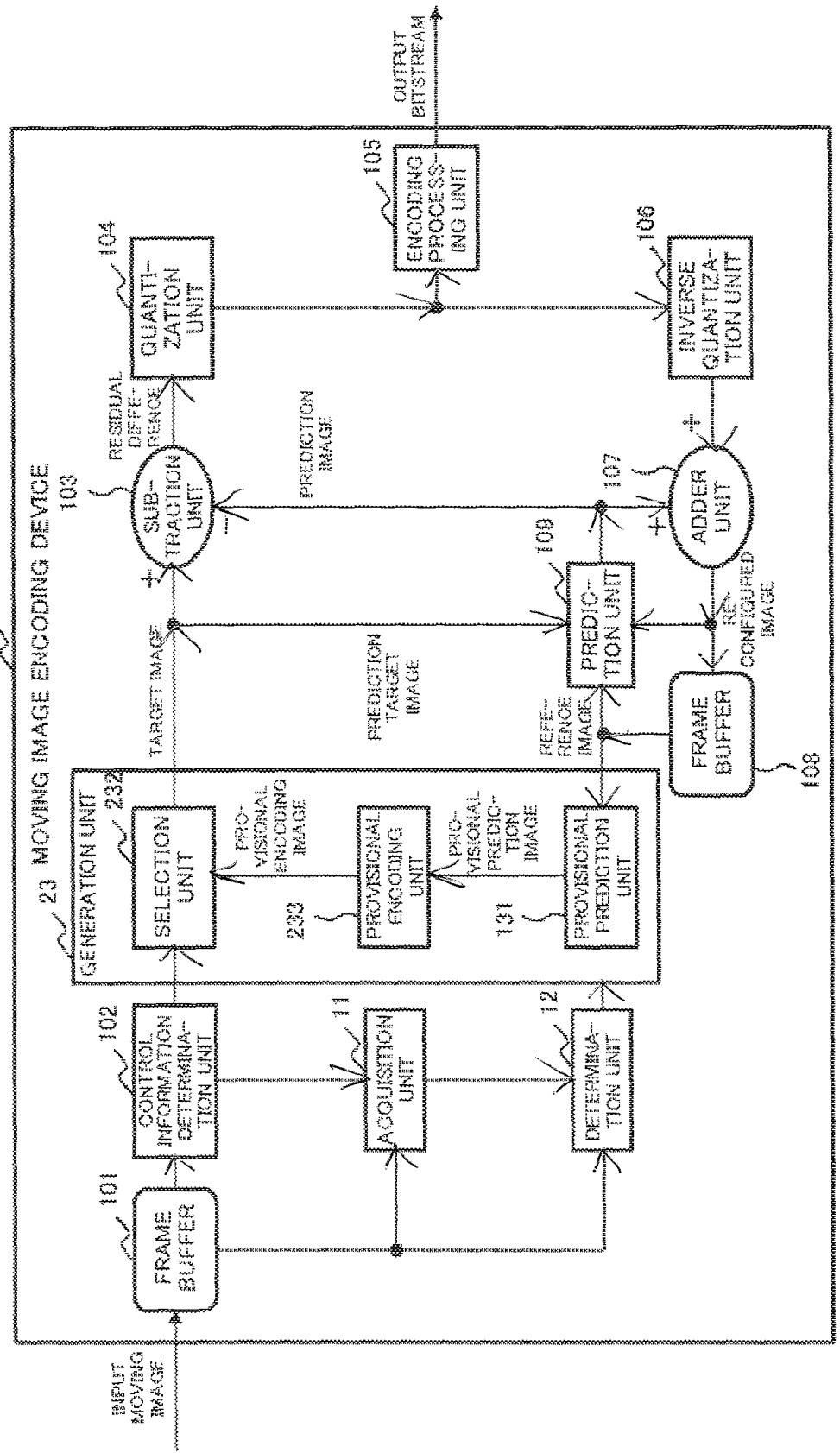
FIG. 6 is a block diagram illustrating a configuration of a moving image encoding device 20 according to a second example embodiment of the invention of the present application.

FIG. 6 is a block diagram conceptually illustrating a configuration of a moving image encoding device 20 according to a second example embodiment of the invention of the present application. In the present example embodiment, components having similar functions to those in the above-described first example embodiment are indicated with same reference numbers as those in the first example embodiment, and accordingly, detailed description thereof is omitted.

As illustrated in FIGS. 1 and 6, the moving image encoding device 20 according to the present example embodiment includes a configuration in which the generation unit 13 is replaced by a generation unit 23 in the moving image encoding device 10 according to the first example embodiment. The generation unit 23 according to the present example embodiment includes a configuration in which the selection unit 132 is replaced by a selection unit 232, and a provisional encoding unit 233 is newly added in the generation unit 13 according to the first example embodiment.

The provisional encoding unit 233 in the generation unit 23 generates a provisional encoding image in which an encoding target frame is encoded by setting a provisional prediction image relating to the encoding target frame generated by the provisional prediction unit 131 as a prediction target image, and using a reference structure used when the provisional prediction unit 131 generates the provisional prediction image.

Figure 7:
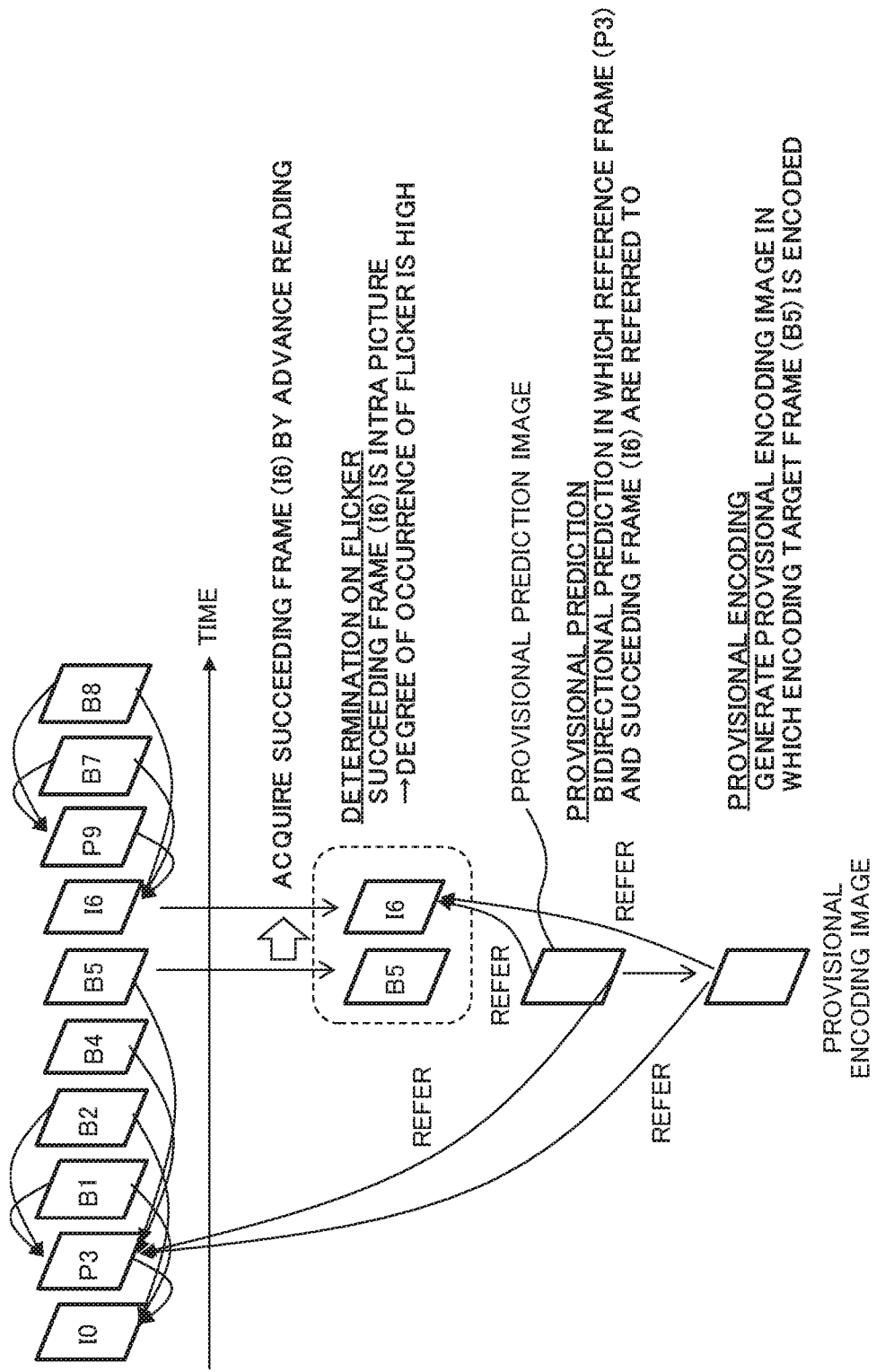
FIG. 7 is a diagram exemplifying processing of generating, as a prediction target image, a provisional encoding image with respect to the moving image exemplified in FIG. 2 by a generation unit 23 according to the second example embodiment of the invention of the present application.

FIG. 7 is a diagram exemplifying processing of generating, as a prediction target image, a provisional encoding image with respect to the moving image exemplified in FIG. 2 by the provisional encoding unit 233 in the generation unit 23 according to the present example embodiment. Similarly to a case that the provisional prediction unit 131 generates a provisional prediction image, the provisional encoding unit 233 generates a reconfigured image relating to an encoding target frame (B5) by performing bidirectional prediction in which a reference frame (P3) and a succeeding frame (I6) are referred to, and outputs the generated reconfigured image, as a provisional encoding image in which the encoding target frame (B5) is encoded.

The provisional encoding unit 233 may use, as a provisional encoding image, a reconfigured image generated by the above-described procedure as it is, or may correct a generated provisional encoding image by using an image acquired by performing weighted addition averaging for the reconfigured image and an input image.

The selection unit 232 selects either a provisional encoding image generated by the provisional encoding unit 233, or an input image output by a control information determination unit 102, inputs the selected image to a subtraction unit 103 as a target image, and inputs the selected image to a prediction unit 109 as a prediction target image.

When the encoding target frame is an intra picture, the selection unit 232 selects an input image output by the control information determination unit 102. When the encoding target frame is an inter picture, and a determination result by a determination unit 12 indicates that a degree of occurrence of flicker does not satisfy a first criterion, the selection unit 232 selects the input image output by the control information determination unit 102. When the encoding target frame is an inter picture, and a determination result by the determination unit 12 indicates that the degree of occurrence of flicker satisfies the first criterion, the selection unit 232 selects the provisional encoding image generated by the provisional encoding unit 233.

The subtraction unit 103, a quantization unit 104, an encoding processing unit 105, an inverse quantization unit 106, an adder unit 107, a frame buffer 108, and the prediction unit 109, which are included in the moving image encoding device 20 illustrated in FIG. 6, perform encoding processing similar to the above-described moving image encoding device 100 illustrated in FIG. 17 by using a prediction target image (target image) output from the generation unit 13.

Figure 8:
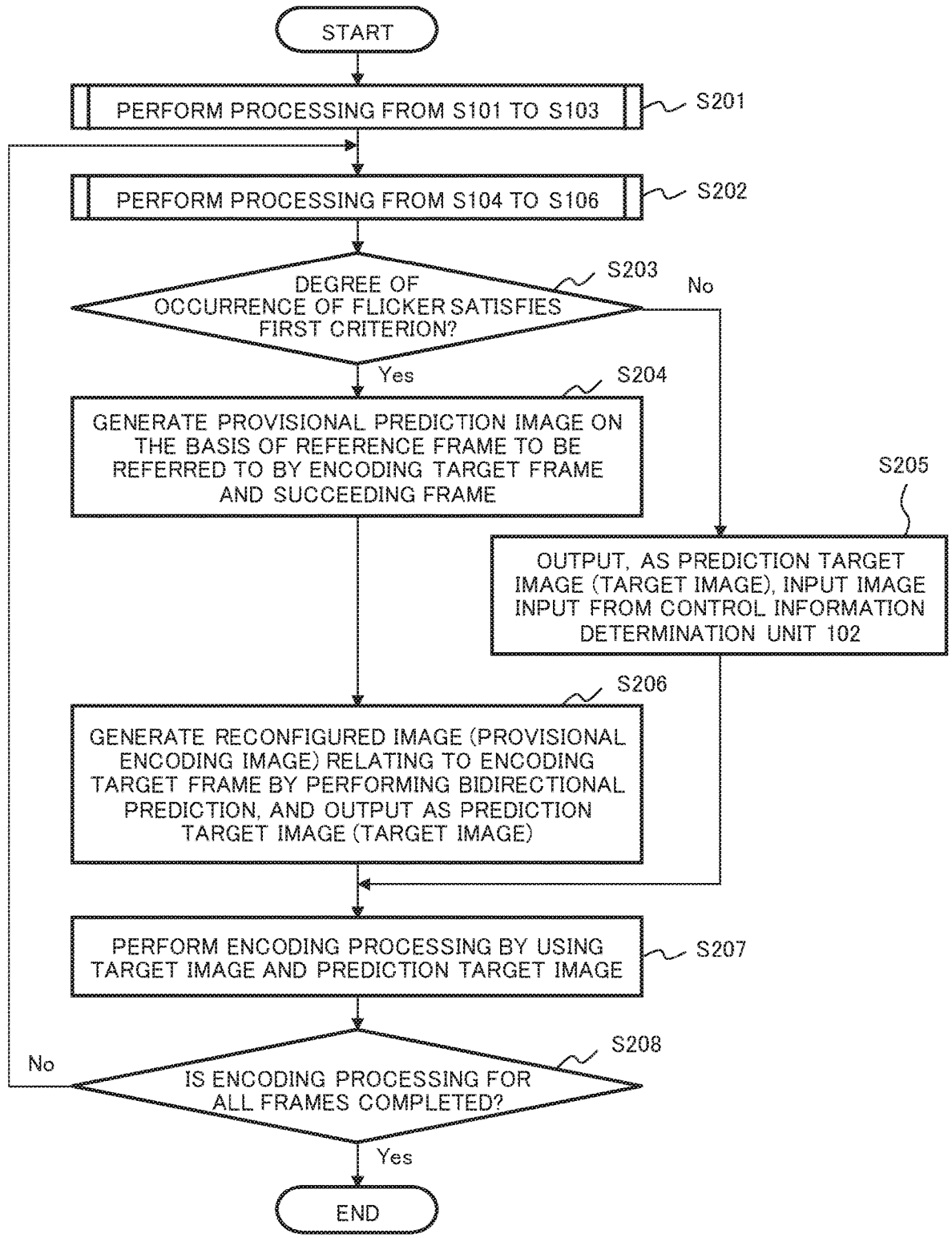
FIG. 8 is a flowchart illustrating an operation of the moving image encoding device 20 according to the second example embodiment of the invention of the present application.

Next, an operation (processing) of the moving image encoding device 20 according to the present example embodiment is described in detail with reference to the flowchart of FIG. 8.

Figure 5:
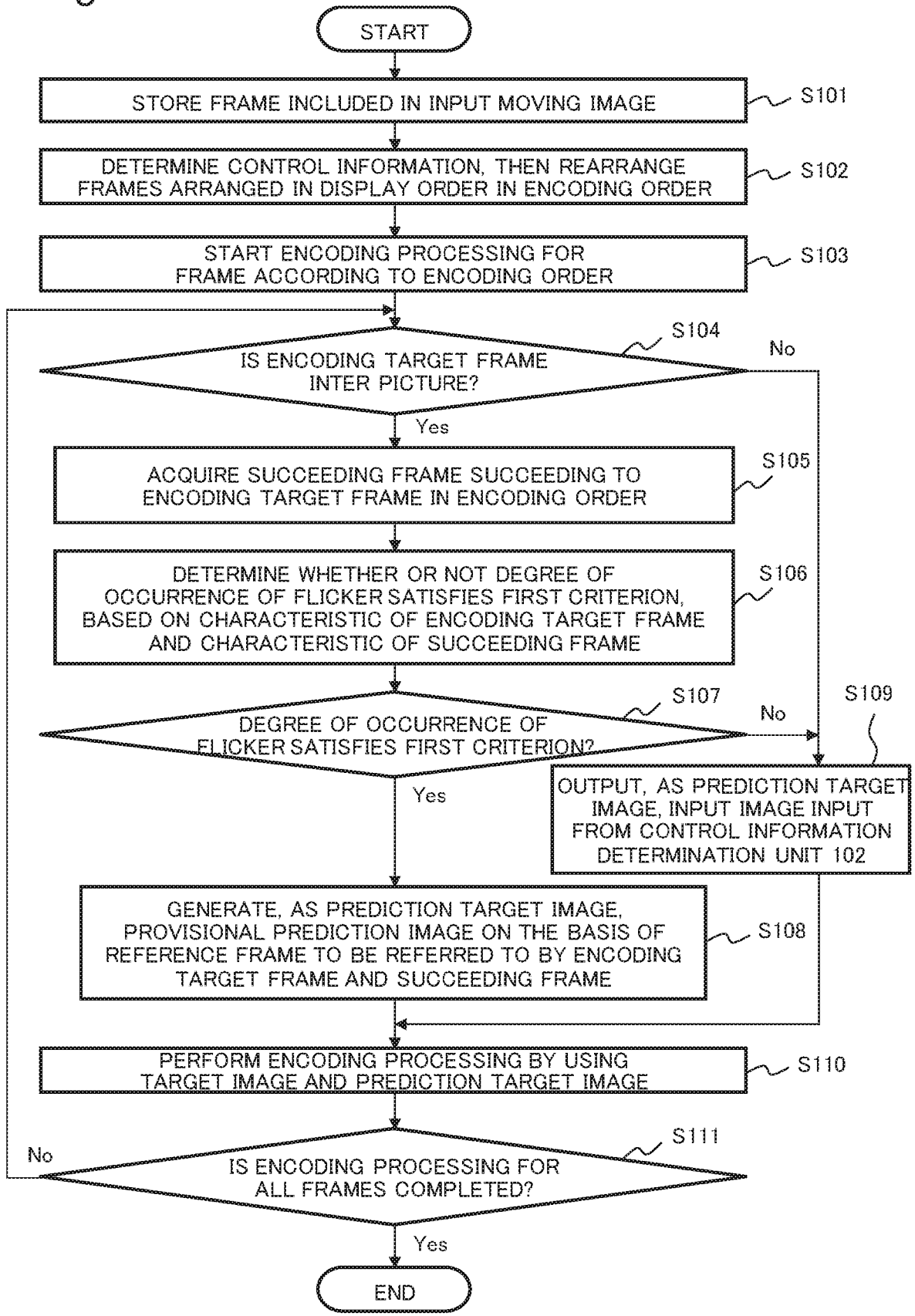
FIG. 5 is a flowchart illustrating an operation of the moving image encoding device 10 according to the first example embodiment of the invention of the present application.

The moving image encoding device 20 performs processing similar to Steps S101 to S103 illustrated in FIG. 5 (Step S201). The moving image encoding device 20 performs processing similar to Steps S104 to S106 illustrated in FIG. 5 (Step S202).

When the degree of occurrence of flicker does not satisfy the first criterion (No in Step S203), the generation unit 23 outputs, as a prediction target image (target image), an input image input from the control information determination unit 102 (Step S205), and the processing proceeds to Step S207. When the degree of occurrence of flicker satisfies the first criterion (Yes in Step S203), the generation unit 23 generates a provisional prediction image on the basis of a reference frame to be referred to by an encoding target frame, and a succeeding frame (Step S204).

The generation unit 23 generates a reconfigured image (provisional encoding image) relating to the encoding target frame by performing bidirectional prediction in which the reference frame and the succeeding frame are referred to, and outputs the provisional encoding image as a prediction target image (target image) (Step S206).

The moving image encoding device 20 performs encoding processing with respect to the encoding target frame by using the target image and the prediction target image (Step S207). When encoding processing with respect to all frames included in the input moving image is not completed (No in Step S208), the processing returns to Step S202. When encoding processing with respect to all frames included in the input moving image is completed (Yes in Step S208), the entire processing is finished.

The moving image encoding device 20 according to the present example embodiment is able to maintain high encoding efficiency, and perform encoding in such a way that occurrence of flicker is reduced when a moving image is reproduced in moving image encoding processing. A reason for this is as described in the moving image encoding device 10 according to the first example embodiment.

Further, the moving image encoding device 20 according to the present example embodiment is able to further reduce occurrence of flicker in a moving image when, in addition to the processing to be performed by the moving image encoding device 10 according to the first example embodiment, an encoded moving image is reproduced by generating a provisional encoding image in which an encoding target frame is encoded by using a provisional prediction image as a prediction target image.

Third Example Embodiment

Figure 9:
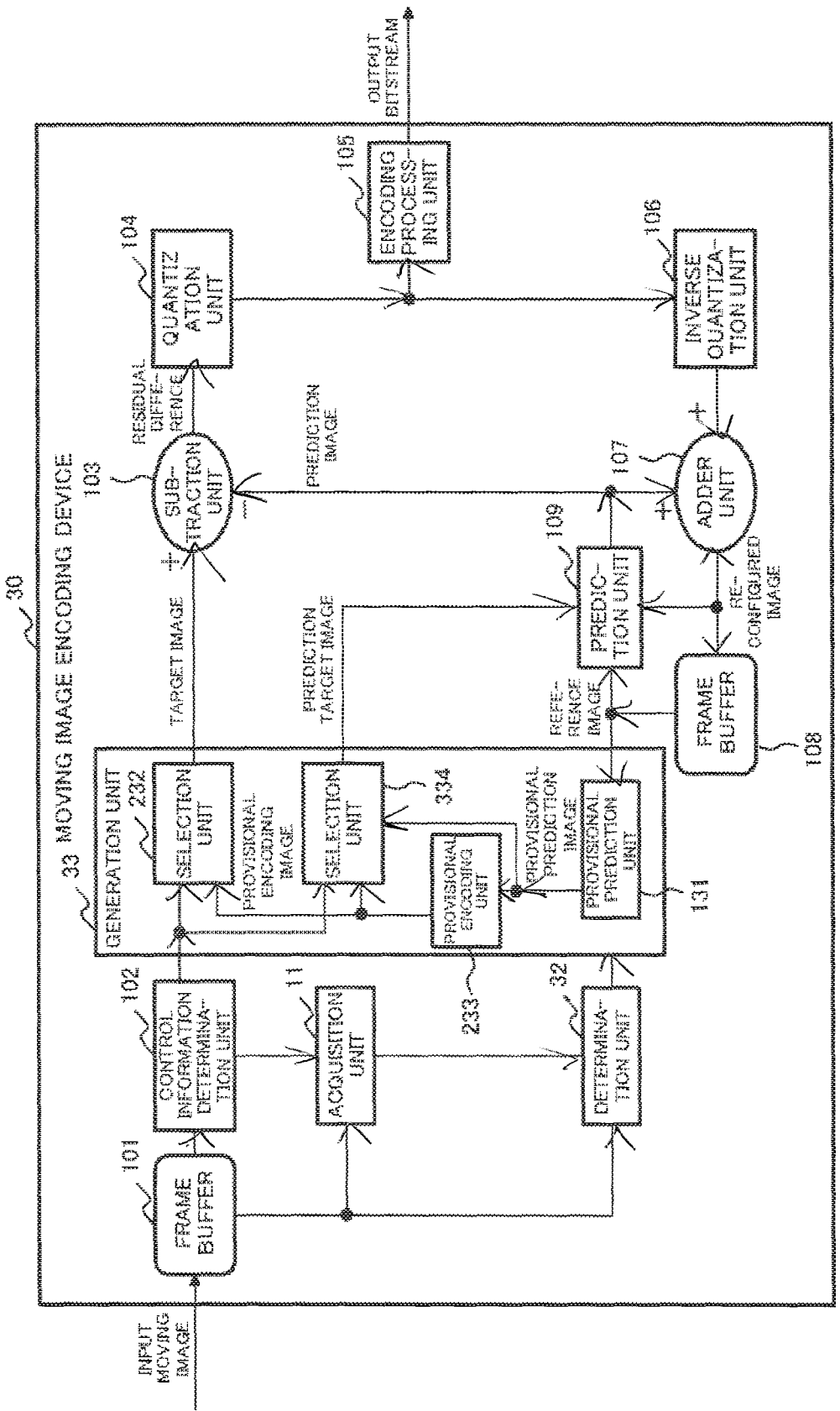
FIG. 9 is a block diagram illustrating a configuration of a moving image encoding device 30 according to a third example embodiment of the invention of the present application.

FIG. 9 is a block diagram conceptually illustrating a configuration of a moving image encoding device 30 according to a third example embodiment of the invention of the present application. In the present example embodiment, components having similar functions to those in the above-described first and second example embodiments are indicated with same reference numbers as those in the first and second example embodiments, and accordingly, detailed description thereof is omitted.

As illustrated in FIGS. 6 and 9, the moving image encoding device 30 according to the present example embodiment includes a configuration in which the determination unit 12 is replaced by a determination unit 32, and the generation unit 23 is replaced by a generation unit 33 in the moving image encoding device 20 according to the second example embodiment.

The determination unit 32 according to the present example embodiment determines whether or not a degree of occurrence of flicker to be presumed in decoding an encoded input moving image satisfies a second criterion in addition to the above-described first criterion, based on a characteristic of an encoding target frame input from an acquisition unit 11, and a characteristic of a succeeding frame. However, it is assumed that the second criterion indicates that a degree of occurrence of flicker is large, as compared with the first criterion. The second criterion can be determined in advance, based on an experimental result by a subject or the like, for example, similarly to the above-described first criterion.

The generation unit 33 according to the present example embodiment includes a configuration in which a selection unit 334 is newly added in the generation unit 23 according to the second example embodiment.

The selection unit 334 selects either a provisional encoding image generated by a provisional encoding unit 233, a provisional prediction image generated by a provisional prediction unit 131, or an input image output by a control information determination unit 102, and inputs the selected image to a prediction unit 109 as a prediction target image.

FIG. 10 is a diagram exemplifying a content of a generation procedure 320 indicating a procedure of generating a target image to be input to a subtraction unit 103, and a prediction target image to be input to the prediction unit 109 by the generation unit 33 according to the present example embodiment. Specifically, it is assumed that the generation procedure 320 is information for controlling a selection operation by the selection units 232 and 334, and, for example, is stored in a memory or the like (not illustrated in FIG. 9) included in the moving image encoding device 30. Note that, in FIG. 10, for convenience of description, the generation procedure 320 is indicated by sentences. Actually, however, it is assumed that the generation procedure 320 is written by operation codes or the like.

The first, second, tenth, and eleventh rows in the generation procedure 320 exemplified in FIG. 10 indicate a selection operation by the selection unit 232 according to the present example embodiment. As exemplified in FIG. 10, in a case that "an encoding target frame is an inter picture to be referred to from another frame", the selection unit 232 according to the present example embodiment outputs an input image as a target image. In a case that "an encoding target frame is not an inter picture to be referred to from another frame", the selection unit 232 outputs a provisional encoding image as a target image. Note that, in this case, the determination unit 32 determines whether or not "an encoding target frame is an inter picture to be referred to from another frame".

The third to ninth, and the twelfth to eighteenth rows in the generation procedure 320 exemplified in FIG. 10 indicate a selection operation by the selection unit 334 according to the present example embodiment. Specifically, when a determination result by the determination unit 12 indicates that the degree of occurrence of flicker satisfies the second criterion, the selection unit 334 selects a provisional encoding image generated by the provisional encoding unit 233. When a determination result by the determination unit 12 indicates that the degree of occurrence of flicker does not satisfy the second criterion, the selection unit 334 selects a provisional prediction image generated by the provisional prediction unit 131.

Figure 11:
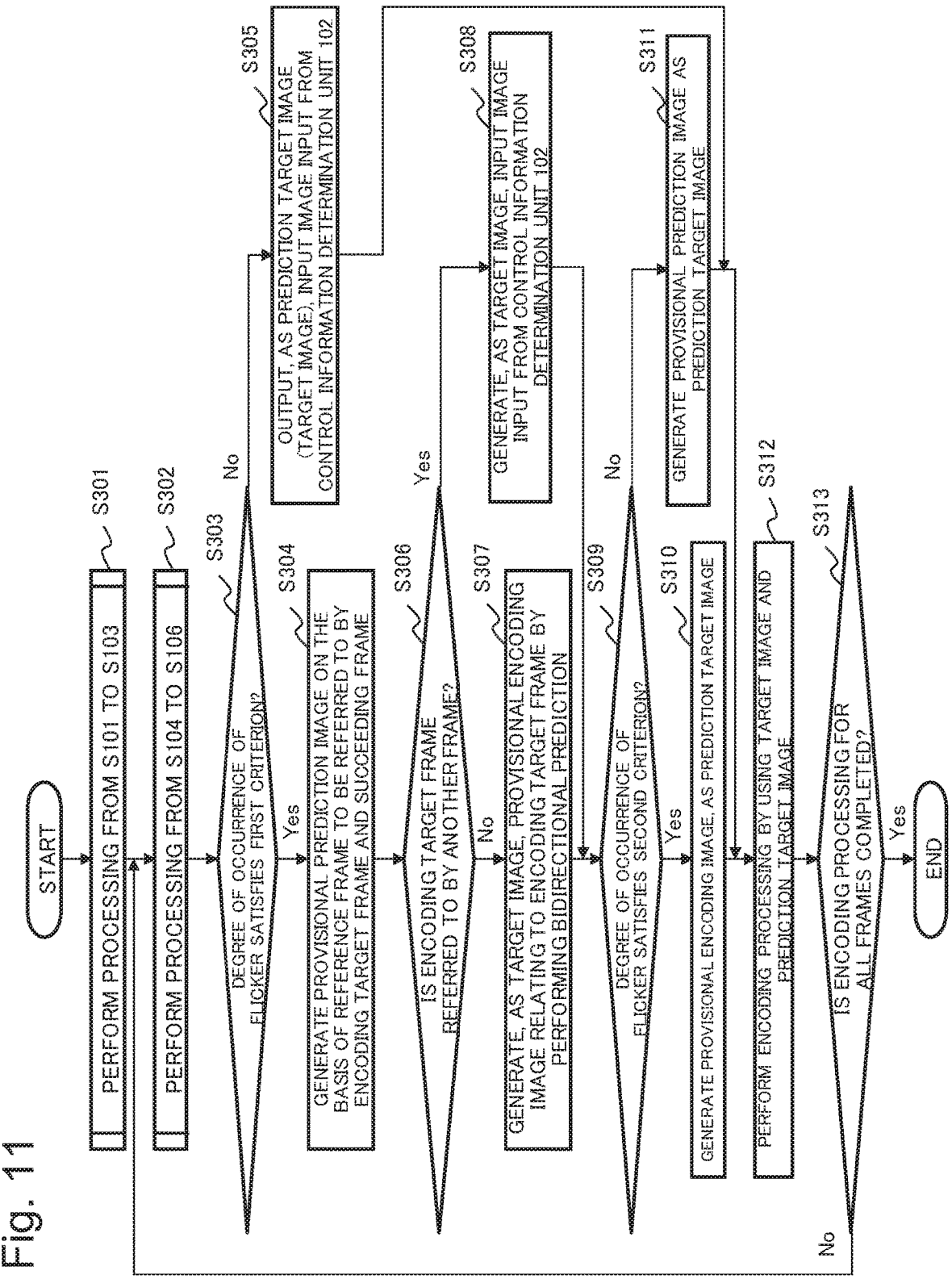
FIG. 11 is a flowchart illustrating an operation of the moving image encoding device 30 according to the third example embodiment of the invention of the present application.

Next, an operation (processing) of the moving image encoding device 30 according to the present example embodiment is described in detail with reference to the flowchart of FIG. 11.

The moving image encoding device 30 performs processing similar to Steps S101 to S103 illustrated in FIG. 5 (Step S301). The moving image encoding device 30 performs processing similar to Steps S104 to S106 illustrated in FIG. 5 (Step S302).

When the degree of occurrence of flicker does not satisfy the first criterion (No in Step S303), the generation unit 33 outputs, as a prediction target image (target image), an input image input from the control information determination unit 102 (Step S305), and the processing proceeds to Step S312. When the degree of occurrence of flicker satisfies the first criterion (Yes in Step S303), the generation unit 33 generates a provisional prediction image on the basis of a reference frame to be referred to by the encoding target frame, and the succeeding frame (Step S304).

When the encoding target frame is referred to from another frame (Yes in Step S306), the generation unit 33 generates, as a target image, the input image input from the control information determination unit 102 (Step S308). When the encoding target frame is not referred to from another frame (No in Step S306), the generation unit 33 generates a provisional encoding image relating to the encoding target frame by performing bidirectional prediction in which the reference frame and the succeeding frame are referred to, and outputs the provisional encoding image, as a target image (Step S307).

When the degree of occurrence of flicker satisfies the second criterion (Yes in Step S309), the generation unit 33 generates a provisional encoding image, as a prediction target image (Step S310). When the degree of occurrence of flicker does not satisfy the second criterion (No in Step S309), the generation unit 33 generates a provisional prediction image, as a prediction target image (Step S311).

The moving image encoding device 30 performs encoding processing with respect to the encoding target frame by using the target image and the prediction target image (Step S312). When encoding processing with respect to all frames included in the input moving image is not completed (No in Step S313), the processing returns to Step S302. When encoding processing with respect to all frames included in the input moving image is completed (Yes in Step S313), the entire processing is finished.

The moving image encoding device 30 according to the present example embodiment is able to maintain high encoding efficiency, and perform encoding in such a way that occurrence of flicker is reduced when a moving image is reproduced in moving image encoding processing. A reason for this is as described in the moving image encoding device 10 according to the first example embodiment.

Further, the moving image encoding device 30 according to the present example embodiment selects, as a target image, an input image or a provisional encoding image depending on a degree of occurrence of flicker. The moving image encoding device 30 selects, as a prediction target image, any of an input image, a provisional encoding image, and a provisional prediction image depending on the degree of occurrence of flicker. Thus, the moving image encoding device 30 according to the present example embodiment is able to perform flexible flicker reduction processing depending on a degree of occurrence of flicker for each of frames. Further, in this case, since flicker reduction processing is performed with an optimum intensity for each of frames, the moving image encoding device 30 is able to reduce an amount of calculation necessary for the flicker reduction processing.

Fourth Example Embodiment

Figure 12:
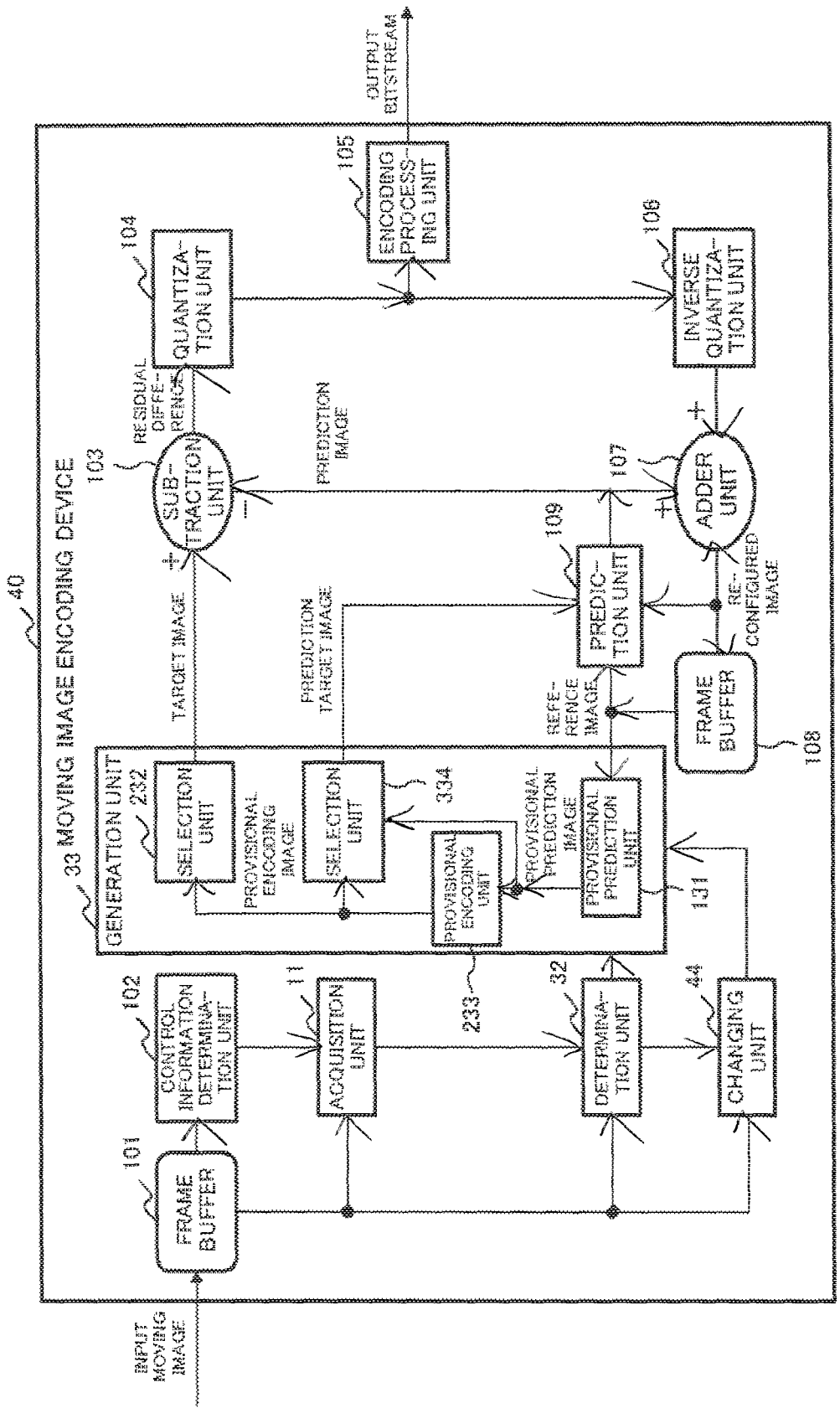
FIG. 12 is a block diagram illustrating a configuration of a moving image encoding device 40 according to a fourth example embodiment of the invention of the present application.

FIG. 12 is a block diagram conceptually illustrating a configuration of a moving image encoding device 40 according to a fourth example embodiment of the invention of the present application. In the present example embodiment, components having similar functions to those in the above-described first to third example embodiments are indicated with same reference numbers as those in the first to third example embodiments, and accordingly, detailed description thereof is omitted.

As illustrated in FIGS. 9 and 12, the moving image encoding device 40 according to the present example embodiment includes a configuration in which a changing unit 44 is added in the moving image encoding device 30 according to the third example embodiment.

The changing unit 44 according to the present example embodiment analyzes, when a determination result by a determination unit 32 indicates that the above-described first criterion is satisfied, whether or not encoding efficiency or image quality relating to an encoded input moving image after decoding improves, based on a characteristic of an encoding target frame and a characteristic of a succeeding frame by changing control information for controlling encoding with respect to the encoding target frame and the succeeding frame. When a result of the analysis indicates improvement of encoding efficiency or image quality after decoding, the changing unit 44 changes control information for controlling encoding.

Figure 13:
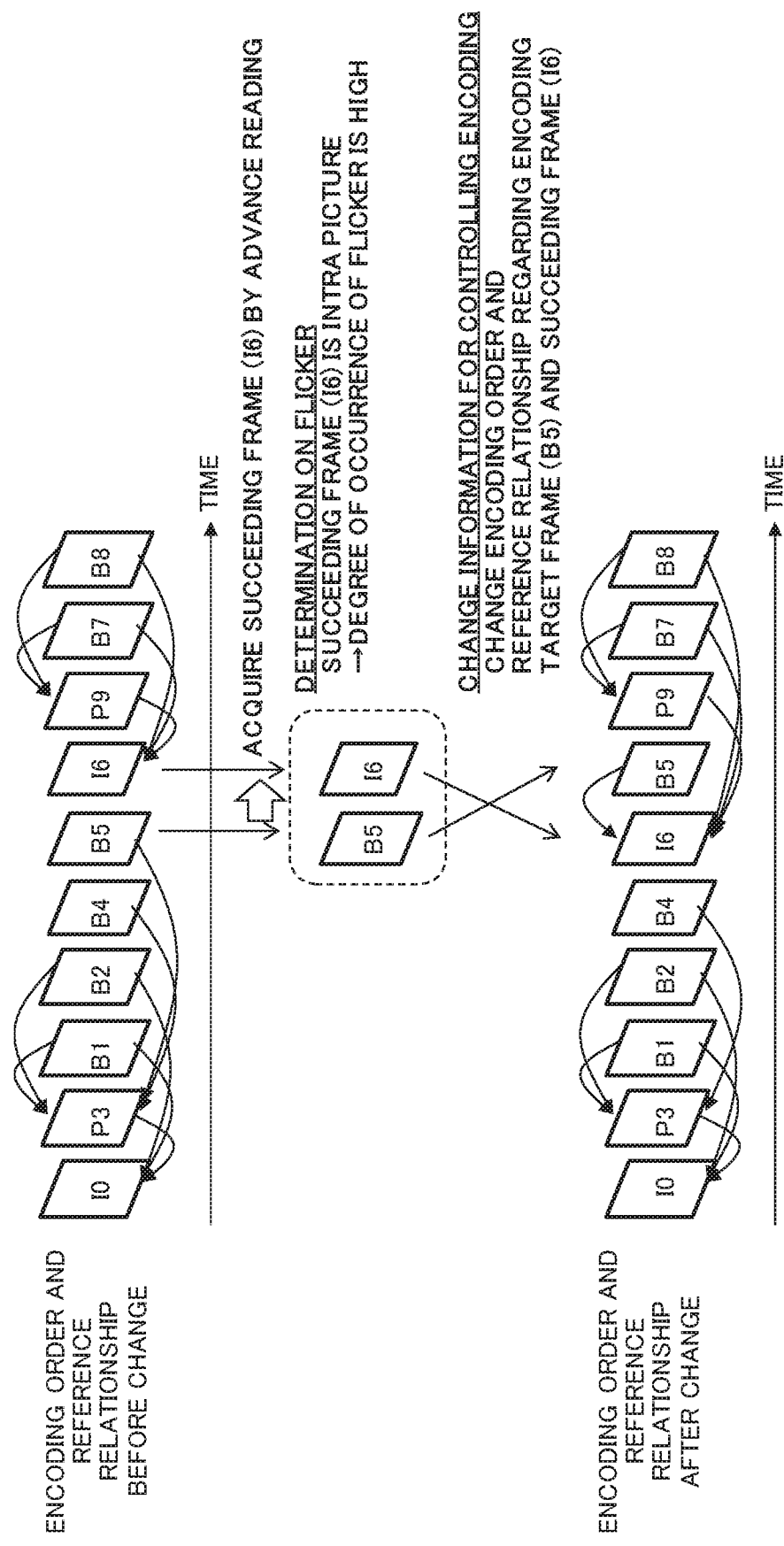
FIG. 13 is a diagram exemplifying processing of changing information for controlling encoding with respect to the moving image exemplified in FIG. 2 by a changing unit 44 according to the fourth example embodiment of the invention of the present application.

FIG. 13 is a diagram exemplifying processing of changing control information for controlling encoding with respect to the moving image exemplified in FIG. 2 by the changing unit 44 according to the present example embodiment. In the example illustrated in FIG. 13, the changing unit 44 reverses the encoding order regarding an encoding target frame (B5) and a succeeding frame (I6), based on a result of the above-described analysis, and changes a frame to be referred to by the encoding target frame (B5) from a frame (P3) to the frame (I6).

The changing unit 44 performs such processing on the basis of the following analysis result by the changing unit 44. Specifically, similarly to the first to third example embodiments, the moving image encoding device 40 performs processing of reducing a degree of occurrence of flicker by using the succeeding frame (I6) with respect to the encoding target frame (B5). In this case, a target image or a prediction target image relating to the encoding target frame (B5) has a tendency that a correlation with respect to the succeeding frame (I6) becomes high. Therefore, an analysis result such that improvement of encoding efficiency and image quality after decoding can be expected by causing the changing unit 44 to change a reference destination in inter frame prediction from the frame (P3) to the frame (I6), when encoding with respect to the encoding target frame (B5) is performed.

Figure 14:
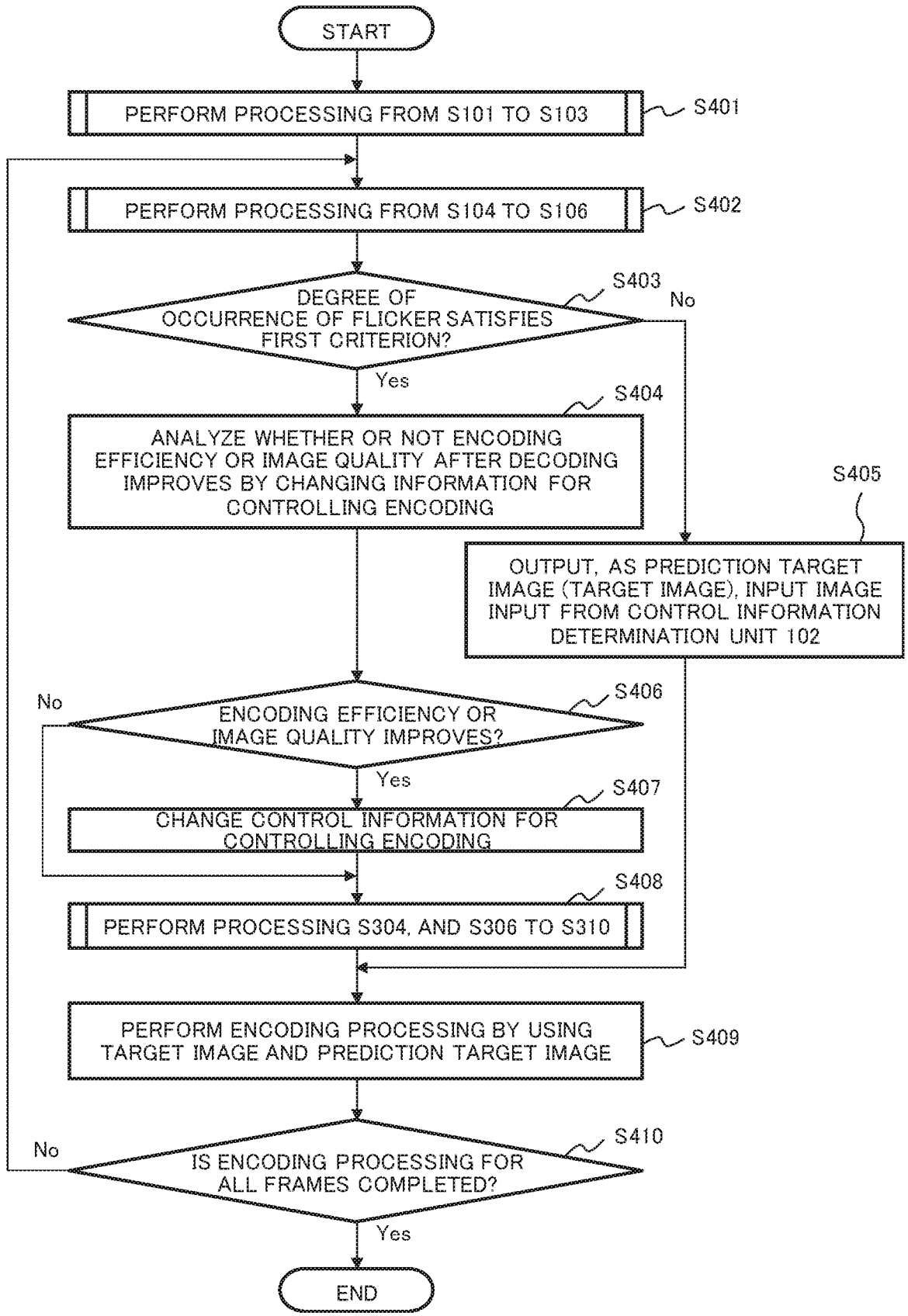
FIG. 14 is a flowchart illustrating an operation of the moving image encoding device 40 according to the fourth example embodiment of the invention of the present application.

Next, an operation (processing) of the moving image encoding device 40 according to the present example embodiment is described in detail with reference to the flowchart of FIG. 14.

The moving image encoding device 40 performs processing similar to Steps S101 to S103 illustrated in FIG. 5 (Step S401). The moving image encoding device 40 performs processing similar to Steps S104 to S106 illustrated in FIG. 5 (Step S402).

When a degree of occurrence of flicker does not satisfy a first criterion (No in Step S403), a generation unit 33 outputs, as a prediction target image (target image), an input image input from a control information determination unit 102 (Step S405), and the processing proceeds to Step S409. When the degree of occurrence of flicker satisfies the first criterion (Yes in Step S403), the changing unit 44 analyzes whether or not encoding efficiency or image quality after decoding improves by changing information for controlling encoding (Step S404).

When encoding efficiency or image quality does not improve (No in Step S406), the processing proceeds to Step S408. When encoding efficiency or image quality improves (Yes in Step S406), the changing unit 44 changes control information for controlling encoding (Step S407). The moving image encoding device 40 performs processing similar to Step S304, and Steps S306 to S310 illustrated in FIG. 11 (Step S408).

The moving image encoding device 40 performs encoding processing with respect to the encoding target frame by using the target image and the prediction target image (Step S409). When encoding processing with respect to all frames included in the input moving image is not completed (No in Step S410), the processing returns to Step S402. When encoding processing with respect to all frames included in the input moving image is completed (Yes in Step S410), the entire processing is finished.

The moving image encoding device 40 according to the present example embodiment is able to maintain high encoding efficiency, and perform encoding in such a way that occurrence of flicker is reduced when a moving image is reproduced in moving image encoding processing. A reason for this is as described in the moving image encoding device 10 according to the first example embodiment.

Further, when a determination result by the determination unit 32 indicates that the first criterion is satisfied, the changing unit 44 according to the present example embodiment analyzes whether or not encoding efficiency or image quality relating to the encoded moving image after decoding improves, based on a characteristic of the target frame and a characteristic of the succeeding frame by changing control information for controlling encoding with respect to the encoding target frame and the succeeding frame. When a result of the analysis indicates improvement, the changing unit 44 changes the control information. Thus, the moving image encoding device 40 according to the present example embodiment is further advantageous in maintaining high encoding efficiency, and reducing occurrence of flicker in a moving image when an encoded moving image is reproduced in moving image encoding processing.

Note that, in the above-described example illustrated in FIG. 13, the moving image encoding device 40 reverses the encoding order regarding the frame (B5) and the frame (I6), and changes a frame to be referred to by the frame (B5) from the frame (P3) to the frame (I6). In this case, by the above-described change, the number of frames included in a GOP changes. However, since there is no reference relationship relating to inter frame prediction extending over GOPs, the moving image encoding device 40 is able to maintain a characteristic of a Closed-GOP. Therefore, the moving image encoding device 40 has no limitation that it is not possible to apply to use in which a Closed-GOP is necessary.

Further, a changing content with respect to control information by the changing unit 44 according to the present example embodiment is not limited to the above-described example. The changing unit 44 may perform changing a picture type from a B picture to an I picture, or changing in such a way that a frame that has been referred to from another frame is not referred to from the another frame in combination.

Fifth Example Embodiment

Figure 15:
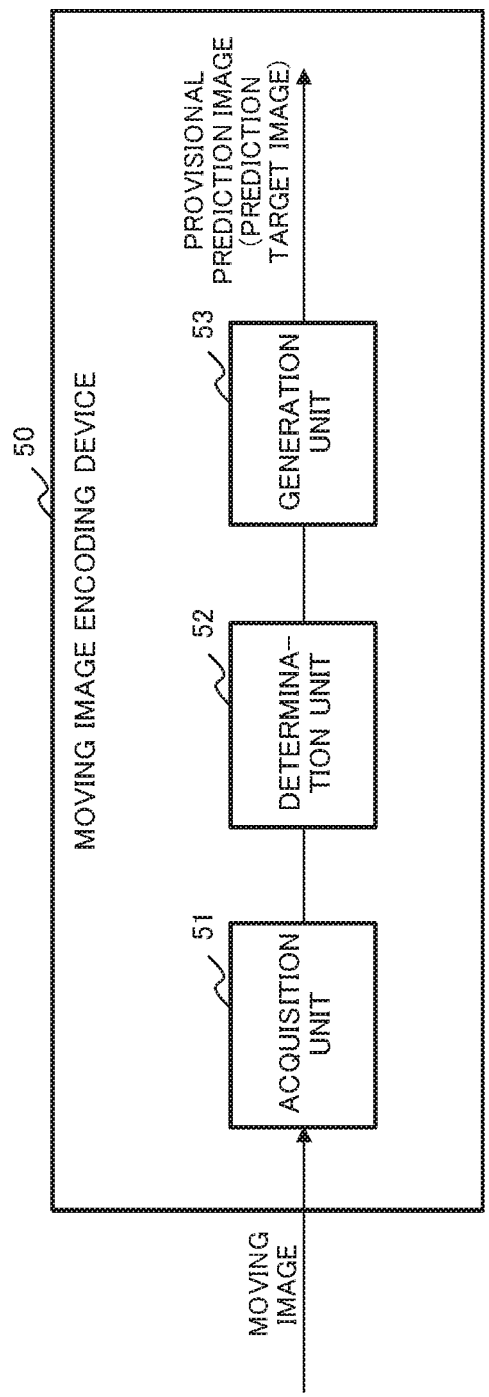
FIG. 15 is a block diagram illustrating a configuration of a moving image encoding device 50 according to a fifth example embodiment of the invention of the present application.

FIG. 15 is a block diagram conceptually illustrating a configuration of a moving image encoding device 50 according to a fifth example embodiment of the invention of the present application.

The moving image encoding device 50 according to the present example embodiment includes an acquisition unit 51, a determination unit 52, and a generation unit 53.

When, in encoding a moving image including a plurality of frames for which an intra picture or an inter picture is determined, a target frame to be encoded among the plurality of frames is the inter picture, the acquisition unit 51 acquires a succeeding frame succeeding to the target frame in an order of encoding the plurality of frames.

The determination unit 52 determines whether or not a degree of occurrence of flicker to be presumed in decoding an encoded moving image satisfies a first criterion, based on a characteristic of the target frame and a characteristic of the succeeding frame.

When a determination result by the determination unit 52 indicates that the first criterion is satisfied, the generation unit 53 generates, as a prediction target image to be used in encoding the target frame, a provisional prediction image on the basis of a reference frame to be referred to by the target frame among the plurality of frames, and the succeeding frame (specifically, on the basis of bidirectional prediction).

The moving image encoding device 50 according to the present example embodiment is able to maintain high encoding efficiency, and perform encoding in such a way that occurrence of flicker is reduced when a moving image is reproduced in moving image encoding processing. A reason for this is that the moving image encoding device 50 determines whether or not a degree of occurrence of flicker satisfies a criterion by acquiring a succeeding frame, when an encoding target frame is an inter picture, and when the criterion is satisfied, the moving image encoding device 50 performs encoding processing by setting a provisional prediction image generated by bidirectional prediction as a prediction target image.

<Hardware Configuration Example>

In the above-described example embodiments, each unit in the moving image encoding device 10 illustrated in FIG. 1, the moving image encoding device 20 illustrated in FIG. 6, the moving image encoding device 30 illustrated in FIG. 9, the moving image encoding device 40 illustrated in FIG. 12, and the moving image encoding device 50 illustrated in FIG. 15 is achievable by a dedicated hardware (HW) (electronic circuit). Further, in FIGS. 1, 6, 9, 12, and 15, at least the following components can be regarded as function (processing) units (software modules) of a software program.

The acquisition units 11 and 51,
the determination units 12, 32, and 52,
the generation units 13, 23, 33, and 53, and
the changing unit 44.

However, classification of the units illustrated in these drawings is a configuration for convenience of explanation, and when the units are actually mounted, various configurations can be proposed. One example of a hardware environment in this case is described with reference to FIG. 16.

Figure 16:
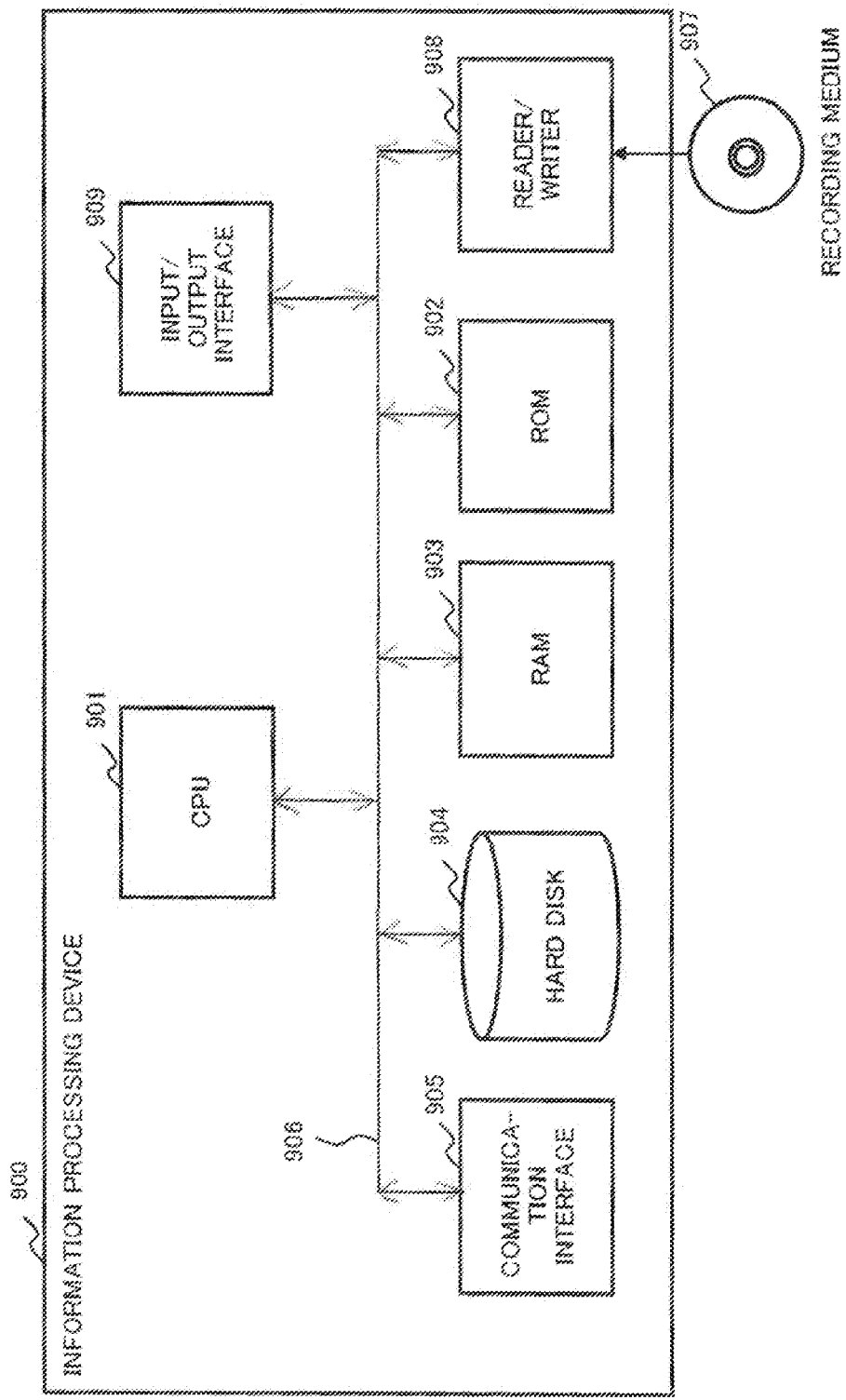
FIG. 16 is a block diagram illustrating a configuration of an information processing device 900 being capable of achieving the moving image encoding devices 10, 20, 30, 40, and 50 according to the example embodiments of the invention of the present application.

FIG. 16 is a diagram exemplarily illustrating a configuration of an information processing device 900 (computer) being capable of achieving the moving image encoding devices 10, 20, 30, 40, and 50 according to the example embodiments of the invention of the present application. Specifically, FIG. 16 illustrates a configuration of a computer (information processing device) being capable of achieving the moving image encoding device 10 illustrated in FIG. 1, the moving image encoding device 20 illustrated in FIG. 6, the moving image encoding device 30 illustrated in FIG. 9, the moving image encoding device 40 illustrated in FIG. 12, and the moving image encoding device 50 illustrated in FIG. 15, or a part thereof; and a hardware environment being capable of achieving the functions in the above-described example embodiments. The information processing device 900 illustrated in FIG. 16 includes the following as constituent elements.

A central processing unit (CPU) 901,
a read only memory (ROM) 902,
a random access memory (RAM) 903,
a hard disk (storage device) 904,
a communication interface 905 for performing communication with an external device via a communication network,
a bus 906 (communication line),
a reader/writer 908 being capable of reading and writing data stored in a recording medium 907 such as a compact disc read only memory (CD-ROM), and
an input/output interface 909.

Specifically, the information processing device 900 including the above-described constituent elements is a general computer to which these components are connected via the bus 906. The information processing device 900 may include a plurality of CPUs 901, or may include a CPU 901 configured by a multiple core.

Further, the invention of the present application described by the above-described example embodiments as an example supplies, to the information processing device 900 illustrated in FIG. 16, a computer program being capable of achieving the following function. The function is the above-described configuration in the block configuration diagrams (FIGS. 1, 6, 9, 12, and 15), or the above-described function in the flowcharts (FIGS. 5, 8, 11, and 14), which are referred to in description of the example embodiments. The invention of the present application, thereafter, is achieved by reading the computer program on the CPU 901 of the hardware for interpretation and execution. Further, the computer program supplied to the device may be stored in a readable and writable volatile memory (RAM 903) or a non-volatile storage device such as the ROM 902 or the hard disk 904.

Furthermore, in the above-described case, nowadays, a general procedure can be employed as a method of supplying the computer program to the hardware. The procedure is, for example, a method of installing the computer program in the device via various recording media 907 such as a CD-ROM, a method of downloading the computer program from an outside via a communication line such as the Internet, or the like. Further, in such case, the invention of the present application can be regarded such that the invention is configured by codes constituting the computer program, or the recording medium 907 storing the codes.

In the foregoing, the invention of the present application is described by using the above-described example embodiments as an exemplary example. The invention of the present application, however, is not limited to the above-described example embodiments. Specifically, the invention of the present application includes various aspects comprehensible to a person skilled in the art within the scope of the invention of the present application.

Note that a part or all of the above-described example embodiments may be described as the following supplementary notes. However, the present invention exemplarily described by the above-described example embodiments is not limited to the following.

(Supplementary Note 1)

A moving image encoding device including:

acquisition means for acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames;

determination means for determining whether or not a degree of occurrence of flicker to be presumed in decoding the moving image being encoded satisfies a first criterion, based on a characteristic of the target frame and a characteristic of the succeeding frame; and generation means for generating, when a determination result by the determination means indicates that the first criterion is satisfied, as a prediction target image to be used in encoding the target frame, a provisional prediction image based on a reference frame and the succeeding frame, the reference frame being referred to by the target frame among the plurality of frames.

(Supplementary Note 2)

The moving image encoding device according to supplementary note 1, wherein the acquisition means acquires the succeeding frames of a different number depending on a position of the target frame in a reference structure included in the moving image.

(Supplementary Note 3)

The moving image encoding device according to supplementary note 1 or 2, wherein the acquisition means repeatedly acquires the succeeding frame in order from the frame located next to the target frame in the order of encoding the plurality of frames until the intra picture, or the inter picture to be referred from another frame appears.

(Supplementary Note 4)

The moving image encoding device according to any one of supplementary notes 1 to 3, wherein the determination means determines, based on at least one of a picture type, a reference relationship in inter frame prediction, and a display characteristic of an image, in relation to the target frame and the succeeding frame.

(Supplementary Note 5)

The moving image encoding device according to supplementary note 4, wherein the determination means determines that, when the succeeding frame is the intra picture, or when the target frame and the succeeding frame are the inter pictures which does not refer to a common frame, the degree of occurrence of flicker satisfies the first criterion.

(Supplementary Note 6)

The moving image encoding device according to any one of supplementary notes 1 to 5, wherein the generation means corrects the provisional prediction image by performing weighted addition averaging of an input image indicated by the target frame and the provisional prediction image being generated.

(Supplementary Note 7)

The moving image encoding device according to supplementary note 6, wherein the generation means sets a weighting coefficient to be used in performing the weighted addition averaging for the input image to a fixed ratio.

(Supplementary Note 8)

The moving image encoding device according to supplementary note 6, wherein the generation means performs the weighted addition averaging for the input image in such a way that a weight of the input image increases, as a timewise distance between the input image and the reference frame increases.

(Supplementary Note 9)

The moving image encoding device according to supplementary note 6, wherein the generation means performs the weighted addition averaging for the input image in such a way that a weight of the provisional prediction image increases, as a value indicating a quantization step to be used in encoding the moving image increases.

(Supplementary Note 10)

The moving image encoding device according to supplementary note 6, wherein the determination means calculates the degree of occurrence of flicker for each of blocks included in the target frame and having a predetermined size, and the generation means performs the weighted addition averaging for the input image in such a way that a weight of the provisional prediction image increases, as the degree of occurrence of flicker increases for each of the blocks.

(Supplementary Note 11)

The moving image encoding device according to any one of supplementary notes 1 to 10, wherein the generation means generates, as a target image and the prediction target image to be used in encoding the target frame, a provisional encoding image, based on a reconfigured image generated by using the reference frame and the succeeding frame.

(Supplementary Note 12)

The moving image encoding device according to supplementary note 11, wherein the generation means corrects the provisional encoding image by performing the weighted addition averaging of an input image indicated by the target frame and the reconfigured image being generated.

(Supplementary Note 13)

The moving image encoding device according to supplementary note 11 or 12, wherein the determination means determines, based on the characteristic of the target frame and the characteristic of the succeeding frame, whether or not a degree of occurrence of flicker to be presumed in decoding the encoded moving image satisfies a second criterion in which a degree is larger than a degree in the first criterion, and the generation means generates, when the determination result by the determination means indicates that the second criterion is satisfied, the provisional encoding image as the prediction target image, and generates, when the determination result by the determination means indicates that the second criterion is not satisfied, the provisional prediction image as the prediction target image.

(Supplementary Note 14)

The moving image encoding device according to any one of supplementary notes 1 to 13, further including:

changing means for analyzing, when the determination result by the determination means indicates that the first criterion is satisfied, whether or not encoding efficiency or image quality relating to the encoded moving image after decoding improves by changing information for controlling encoding with respect to the target frame and the succeeding frame, based on the characteristic of the target frame and the characteristic of the succeeding frame, and when a result of analysis indicates the encoding efficiency or the image quality improves, changing the information for controlling encoding.

(Supplementary Note 15)

The moving image encoding device according to supplementary note 14, wherein the information for controlling encoding includes at least one of an encoding order, a picture type, and a reference relationship with respect to another frame.

(Supplementary Note 16)

A moving image encoding method including:

by an information processing device, acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames;

determining whether or not a degree of occurrence of flicker to be presumed in decoding the moving image being encoded satisfies a first criterion, based on a characteristic of the target frame and a characteristic of the succeeding frame; and generating, when a determination result relating to the degree of occurrence of flicker indicates that the first criterion is satisfied, as a prediction target image to be used in encoding the target frame, a provisional prediction image based on a reference frame and the succeeding frame, the reference frame being referred to by the target frame among the plurality of frames.

(Supplementary Note 17)

A recording medium storing a moving image encoding program for causing a computer to execute:

acquisition processing of acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames;

determination processing of determining whether or not a degree of occurrence of flicker to be presumed in decoding the moving image being encoded satisfies a first criterion, based on a characteristic of the target frame and a characteristic of the succeeding frame; and generation processing of generating, when a determination result by the determination processing indicates that the first criterion is satisfied, as a prediction target image to be used in encoding the target frame, a provisional prediction image based on a reference frame and the succeeding frame, the reference frame being referred to by the target frame among the plurality of frames.

This application is based upon and claims the benefit of priority from Japanese patent application No. 2017-140109, filed on Jul. 19, 2017, the disclosure of which is incorporated herein in its entirety by reference.

INDUSTRIAL APPLICABILITY

The invention of the present application is applicable to video information communication within a wide range, such as digital broadcasting, distribution of a video content by an optical disc, and video distribution via the Internet or the like.

REFERENCE SIGNS LIST

10 Moving image encoding device
101 Frame buffer
102 Control information determination unit
103 Subtraction unit
104 Quantization unit
105 Encoding processing unit
106 Inverse quantization unit
107 Adder unit
108 Frame buffer
109 Prediction unit
11 Acquisition unit
12 Determination unit
13 Generation unit
131 Provisional prediction unit
132 Selection unit
20 Moving image encoding device
23 Generation unit
232 Selection unit
233 Provisional encoding unit
30 Moving image encoding device
32 Determination unit
320 Generation procedure
33 Generation unit
334 Selection unit
40 Moving image encoding device
44 Changing unit
50 Moving image encoding device
51 Acquisition unit
52 Determination unit
53 Generation unit
900 Information processing device 901 CPU
902 ROM
903 RAM
904 Hard disk (storage device)
905 Communication interface
906 Bus
907 Recording medium
908 Reader/writer
909 Input/output interface

What is claimed is:

1. A moving image encoding device comprising:
    at least one memory storing a computer program; and
    at least one processor configured to execute the computer program to:
    acquire, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames;
    determine whether or not a degree of occurrence of flicker to be presumed in decoding the moving image being encoded satisfies a first criterion, based on a characteristic of the target frame and a characteristic of the succeeding frame;
    generate, when a determination result indicates that the first criterion is satisfied, as a prediction target image to be used in encoding the target frame, a provisional prediction image based on a reference frame and the succeeding frame, the reference frame being referred to by the target frame among the plurality of frames;
    correct the provisional prediction image by performing weighted addition averaging of an input image indicated by the target frame and the provisional prediction image being generated;
    set a weighting coefficient to be used in performing the weighted addition averaging for the input image to a fixed ratio; and
    perform intra frame prediction processing or inter frame prediction processing by referring to the provisional prediction image and the reference frame.

2. The moving image encoding device according to claim 1, wherein the processor is configured to execute the computer program to:
    acquire the succeeding frames of a different number depending on a position of the target frame in a reference structure included in the moving image.

3. The moving image encoding device according to claim 1, wherein the processor is configured to execute the computer program to:
    repeatedly acquire the succeeding frame in order from the frame located next to the target frame in the order of encoding the plurality of frames until the intra picture, or the inter picture to be referred from another frame appears.

4. The moving image encoding device according to claim 1, wherein the processor is configured to execute the computer program to:
    determine, based on at least one of a picture type, a reference relationship in inter frame prediction, and a display characteristic of an image, in relation to the target frame and the succeeding frame.

5. The moving image encoding device according to claim 4, wherein the processor is configured to execute the computer program to:
    determine that, when the succeeding frame is the intra picture, or when the target frame and the succeeding frame are the inter pictures which does not refer to a common frame, the degree of occurrence of flicker satisfies the first criterion.

6. The moving image encoding device according to claim 1, wherein the processor is configured to execute the computer program to:
    perform the weighted addition averaging for the input image in such a way that a weight of the input image increases, as a timewise distance between the input image and the reference frame increases.

7. The moving image encoding device according to claim 1, wherein the processor is configured to execute the computer program to:
    perform the weighted addition averaging for the input image in such a way that a weight of the provisional prediction image increases, as a value indicating a quantization step to be used in encoding the moving image increases.

8. The moving image encoding device according to claim 1, wherein the processor is configured to execute the computer program to:
    calculate the degree of occurrence of flicker for each of blocks included in the target frame and having a predetermined size; and
    perform the weighted addition averaging for the input image in such a way that a weight of the provisional prediction image increases, as the degree of occurrence of flicker increases for each of the blocks.

9. The moving image encoding device according to claim 1, wherein the processor is configured to execute the computer program to:
    generate, as a target image and the prediction target image to be used in encoding the target frame, a provisional encoding image, based on a reconfigured image generated by using the reference frame and the succeeding frame.

10. The moving image encoding device according to claim 9, wherein the processor is configured to execute the computer program to:
    correct the provisional encoding image by performing the weighted addition averaging of an input image indicated by the target frame and the reconfigured image being generated.

11. The moving image encoding device according to claim 9, wherein the processor is configured to execute the computer program to:
    determine, based on the characteristic of the target frame and the characteristic of the succeeding frame, whether or not a degree of occurrence of flicker to be presumed in decoding the encoded moving image satisfies a second criterion in which a degree is larger than a degree in the first criterion;
    generate, when the determination result indicates that the second criterion is satisfied, the provisional encoding image as the prediction target image; and
    generate, when the determination result indicates that the second criterion is not satisfied, the provisional prediction image as the prediction target image.

12. The moving image encoding device according to claim 1, wherein the processor is configured to execute the computer program to:
    analyze, when the determination result indicates that the first criterion is satisfied, whether or not encoding efficiency or image quality relating to the encoded moving image after decoding improves by changing information for controlling encoding with respect to the target frame and the succeeding frame, based on the characteristic of the target frame and the characteristic of the succeeding frame; and when a result of analysis indicates the encoding efficiency or the image quality improves, change the information for controlling encoding.

13. The moving image encoding device according to claim 12, wherein
the information for controlling encoding includes at least one of an encoding order, a picture type, and a reference relationship with respect to another frame.

14. A moving image encoding method comprising:
by an information processing device,
acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames;

determining whether or not a degree of occurrence of flicker to be presumed in decoding the moving image being encoded satisfies a first criterion, based on a characteristic of the target frame and a characteristic of the succeeding frame;

generating, when a determination result relating to the degree of occurrence of flicker indicates that the first criterion is satisfied, as a prediction target image to be used in encoding the target frame, a provisional prediction image based on a reference frame and the succeeding frame, the reference frame being referred to by the target frame among the plurality of frames;

correcting the provisional prediction image by performing weighted addition averaging of an input image indicated by the target frame and the provisional prediction image being generated;

setting a weighting coefficient to be used in performing the weighted addition averaging for the input image to a fixed ratio; and performing intra frame prediction processing or inter frame prediction processing by referring to the provisional prediction image and the reference frame.

15. A non-transitory computer-readable recording medium storing a moving image encoding program for causing a computer to execute:

acquiring, when, in encoding a moving image including a plurality of frames for which an intra picture or an inter picture is determined, a target frame to be encoded among the plurality of frames is the inter picture, a succeeding frame succeeding to the target frame in an order of encoding the plurality of frames;

determining whether or not a degree of occurrence of flicker to be presumed in decoding the moving image being encoded satisfies a first criterion, based on a characteristic of the target frame and a characteristic of the succeeding frame;

generating, when a determination result indicates that the first criterion is satisfied, as a prediction target image to be used in encoding the target frame, a provisional prediction image based on a reference frame and the succeeding frame, the reference frame being referred to by the target frame among the plurality of frames;

correcting the provisional prediction image by performing weighted addition averaging of an input image indicated by the target frame and the provisional prediction image being generated;

setting a weighting coefficient to be used in performing the weighted addition averaging for the input image to a fixed ratio; and performing intra frame prediction processing or inter frame prediction processing by referring to the provisional prediction image and the reference frame.

* * * * *